United States Patent [19]

Nakamura et al.

[11] Patent Number: 4,468,452

[45] Date of Patent: Aug. 28, 1984

[54] COLOR DIFFUSION TRANSFER PHOTOGRAPHIC ELEMENTS

[75] Inventors: Shigeru Nakamura; Shigetoshi Ono; Seiji Suzuki; Hirohisa Suzuki, all of Kanagawa, Japan

[73] Assignee: Fuji Photo Film Company, Limited, Kanagawa, Japan

[21] Appl. No.: 478,568

[22] Filed: Mar. 24, 1983

[30] Foreign Application Priority Data

Mar. 24, 1982 [JP] Japan .................................. 57/46540

[51] Int. Cl.³ .......................... G03C 5/54; G03C 1/40; G03C 7/00
[52] U.S. Cl. .................................... 430/223; 430/222; 430/225; 430/226; 430/562
[58] Field of Search ............... 430/222, 223, 225, 226, 430/562, 213

[56] References Cited

U.S. PATENT DOCUMENTS

| 4,299,895 | 11/1981 | Archie et al. | 430/223 |
| 4,358,527 | 11/1982 | Bailey et al. | 430/223 |
| 4,407,931 | 10/1983 | Evans | 430/223 |

FOREIGN PATENT DOCUMENTS 106727 9/1977 Japan .................................. 430/223

OTHER PUBLICATIONS

*Research Disclosure*, No. 15654, 4/1977, pp. 32–39.

*Primary Examiner*—Richard L. Schilling
*Attorney, Agent, or Firm*—Sughrue, Mion, Zinn, Macpeak and Seas

[57] ABSTRACT

A color diffusion transfer photographic element comprising a support having provided thereon a layer containing a dye-providing material associated with a light-sensitive silver halide emulsion, wherein said dye-providing material is a metal chelate compound represented by the following general formula (I) or (II):

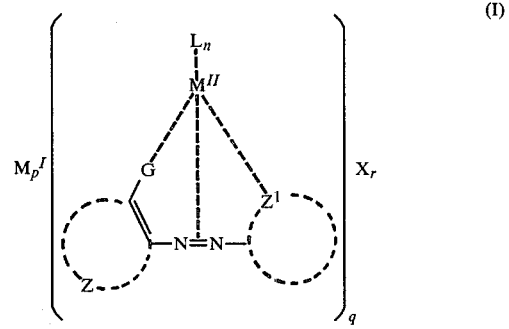

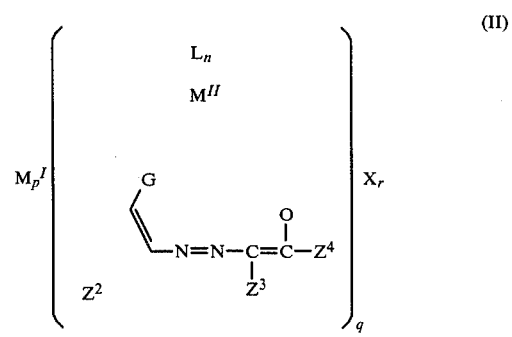

wherein $M^I$ represents a monovalent, divalent, or trivalent cation; X represents a monovalent, divalent, or trivalent anion; Z and $Z^2$ each represents an aromatic carbon ring nucleus or heterocyclic ring nucleus having 5 to 7 carbon atoms; G represents a chelating group; $Z^1$ represents an aromatic carbon ring nucleus or heterocyclic nucleus composed of 5 to 7 atoms; said nucleus having (a) a nitrogen atom, or (b) a carbon atom bonded to a chelating group at the position adjacent to the position bonded to the azo group; $Z^3$ represents an electron attractive group; $Z^4$ represents an alkyl group, an aryl group, or a substituted amino group; L represents a ligand including a dye ligand; $M^{II}$ represents a metal ion weakly coordinated to the dye ligand moiety as compared with the metal ion contained in the image-receiving layer; and p, r and n each is an integer of 0 to 5 and q is 1, 2 or 3 and take a combination that the charges of the total chelate dyes become zero, wherein the chelate compound further contains (1) a carrier component losing the diffusible property or (2) a ballasted carrier capable of releasing a diffusible dye when the silver halide emulsion is developed under an alkaline condition.

18 Claims, No Drawings

COLOR DIFFUSION TRANSFER PHOTOGRAPHIC ELEMENTS

FIELD OF THE INVENTION

This invention relates to photographic recording materials and, more particularly, to color diffusion transfer photographic elements which include metal chelate dye-providing materials.

BACKGROUND OF THE INVENTION

It is known that dye-providing materials are usually used for photographic recording materials, in particular photographic recording materials which undergo a diffusion transfer process. In this case, the stability, in particular, the light fastness of dye images formed is a major problem. Metal chelate dye-providing materials are known for improving the light fastness of dye images. Examples of using metal chelate dye-providing materials are described in, for example, U.S. Pat. No. 3,196,014.

In a diffusion transfer photographic process, the diffusion speed in the photographic recording materials is delayed since the metal chelate dye-providing material having a high light fastness generally has a large molecular weight. This causes a problem in that the appearance of an image after exposure and development is belated and it takes a longer time to complete the formation of the image. In an effort to eliminate this problem there has been proposed a process of forming a metal chelate dye in an image-receiving layer having a combination of a chelatable dye ligand or a chelatable dye ligand-providing material and a metal ion. This process is described in European Pat. No. 9,411A2. The corresponding U.S. Pat. No. 4,239,847, and U.S. Pat. Nos. 4,229,895 and 4,229,515 are related to this U.S. Patent.

However, since the chelatable dye ligand or dye ligand-providing material is very likely to coordinate to a metal ion, there is a large tendency for the chelatable dye ligand or the dye ligand-providing material to react with a metal ion liberated from the image-receiving element during the preparation of the photographic element or during the preservation of the photographic element to be converted into a metal chelate compound. When this takes place the hue greatly changes and the molecular weight frequently increases due to the formation of a coordination bond, resulting in problems, such as a substantial reduction in photographic sensitivity, a change in color sensitivity, an increase in the time required for finishing the image, etc.

An effort to eliminate this problem involves a process of fixing a metal ion to the image-receiving layer or a layer adjacent to the image-receiving layer using a coordinatable polymer (polymer liqand). This process is described in Japanese Patent Application (OPI) No. 48210/80, corresponding to U.S. Pat. No. 4,239,847 (the term "OPI" as used herein refers to a "published unexamined Japanese patent application").

However, when a polymer capable of causing a strong coordination bond to a metal ion is used in the process, the metallization of the dye ligand released after exposure and development in the image-receiving element frequently becomes imperfect. In such a case, a transferred dye image having a good hue cannot be obtained since the unmetallized dye ligand frequently shows a different hue from that of the metallized dye ligand. Further, the light fastness of the transferred dye image is insufficient.

When preparing a multilayer color photographic material using cyan, magenta and yellow dyes, it becomes difficult to balance the reactivities of the three kinds of dyes for metal ions. That is, if a metal ion is firmly fixed in the image-receiving unit using a polymer ligand, etc., so that the dye ligand or dye ligand-providing material capable of easily coordinating to the metal ion does not react with the metal ion liberated from the image-receiving unit, the dye ligand moiety released at processing from the most uncoordinatable dye ligand or dye ligand-providing material becomes unmetallizable in the image-receiving unit.

SUMMARY OF THE INVENTION

The object of this invention is to provide an improved color diffusion transfer photographic element using a metal chelate dye-providing material without the foregoing inconveniences and faults present in conventional photographic materials.

It has now been discovered that the object of this invention is attained by using the following dye-providing materials.

That is, the photographic element of this invention is a color diffusion transfer photographic element including a layer containing a dye-providing material associated with a light-sensitive silver halide emulsion, wherein the foregoing dye-providing material is the metal chelate compound represented by the following general formula (I) or (II)

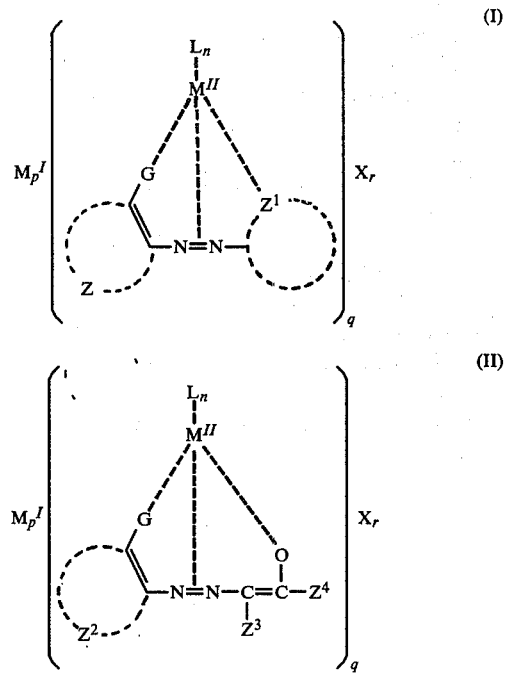

wherein $M^I$ represents a monovalent, divalent or trivalent cation (e.g., an alkali metal ion, an alkaline earth metal ion, or a quaternary ammonium ion); X represents a monovalent, divalent or trivalent anion (e.g., an acetate ion, a chloride ion, a sulfate iion, etc.); Z and $Z^2$ each represents an aromatic carbon ring nucleus or heterocyclic nucleus composed of 5 to 7 carbon atoms; G represents a chelating group; $Z^1$ represents an aromatic carbon ring nucleus or heterocyclic nucleus composed of 5 to 7 atoms (examples of hetero atoms include N, S and O); said nucleus having (a) a nitrogen atom, or (b) further a carbon atom having bonded thereto a chelating group which can form a fused ring, at the position adjacent to the portion thereof bonded to an azo group; $Z^3$ represents an electron attractive group; $Z^4$ represents an alkyl group, an aryl group, or a substituted amino group; L represents a ligand including a dye ligand; $M^{II}$ represents a metal ion weakly coordinating to the dye ligand moiety as compared to the metal ion contained in the image-receiving layer; and p, r and n each is an integer of 0 to 5 and q is 1, 2 or 3 and select a combination so that the charges of the whole chelate dye become zero, and the aforesaid chelate compound contains (1) a carrier component capable of losing the diffusibility or (2) a ballasted carrier component capable of releasing a diffusible dye in relation to the case of developing the foregoing silver halide emulsion under an alkaline condition.

DETAILED DESCRIPTION OF THE INVENTION

In the general formulae (I) and (II), preferred examples of the cation shown by $M^I$ include alkali metal ions, alkaline earth metal ions, quaternary ammonium ions, particularly preferred examples include $Na^+$ and $K^+$, and preferred examples of the anion shown by X includes an acetate ion, a chloride ion, a sulfate ion, a particularly preferred example is an acetic acid ion.

Z and $Z^2$ each represents an aromatic carbon ring nucleus or heterocyclic nucleus composed of 5 to 7 atoms and each nucleus may have a substituent. Examples of the nuclei are a benzene ring nucleus, a naphthalene ring nucleus, a pyrazole ring nucleus, a pyrimidine ring nucleus, a pyridine ring nucleus, etc., but a benzene ring nucleus, a naphthalene ring nucleus, and a pyrazole ring nucleus are particularly preferred.

Preferred examples of the chelating group shown by G are a hydroxyl group, a carboxyl group, an amino group, a sulfamoyl group, etc.

Preferred examples of the aromatic carbon ring nucleus or heterocyclic nucleus composed of 5 to 7 atoms shown by $Z^1$ are the nuclei shown by the following formulae:

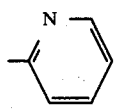

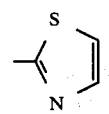

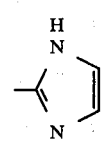

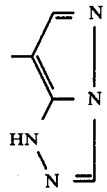

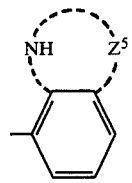

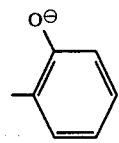

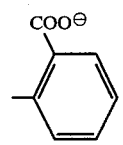

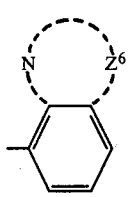

wherein $Z^5$ represents a hydrogen atom, an arylsulfone group, or a non-metallic group necessary to complete a saturated aliphatic ring fused to a benzene ring; wherein $Z^6$ represents a non-metallic group necessary to complete a 5- to 6-membered aromatic ring fused to a benzene ring.

The above-mentioned carbon ring nucleus and heterocyclic nucleus of $Z^1$ may be substituted by a substituent or fused by a ring. Particularly preferred nuclei of $Z^1$ are a pyridine nucleus, a thiazole nucleus, a pyrimidine nucleus and a pyrazolotriazole nucleus.

Examples of the electron attractive group shown in $Z^3$ includes a substituted or unsubstituted sulfamoyl group or a substituted or unsubstituted carbamoyl group. Examples of the substituent for the substituted sulfamoyl and carbamoyl groups are an alkyl group (preferably having 1 to 8 carbon atoms and includes substituted alkyl groups such as a 2-hydroxyethyl group, a 2-sulfamoylethyl group, etc.) or an aryl group (preferably having 6 to 10 carbon atoms and includes a substituted aryl group such as a p-sulfamoylphenyl group, an m-hydroxyphenyl group, etc.). Preferred examples of the substituted sulfamoyl and carbamoyl groups are a diethylsulfamoyl group, a dibutylcarbamoyl group, a phenylcarbamoyl group, etc. Other examples of the electron attractive group shown by $Z^3$ are an alkylsulfonyl group (e.g., an ethylsulfonyl group, an isopropylsulfonyl group, a hydroxyethylsulfonyl group, etc.), an arylsulfonyl group (e.g., a phenylsulfonyl group, a p-sulfamoylphenylsulfonyl group, etc.), and a cyano group. Particularly preferred examples of the electron attractive group are a phenylcarbamoyl group and a cyano group.

Examples of the alkyl group shown by $Z^4$ are the alkyl groups having, preferably 1 to 8 carbon atoms, which may have a substituent, such as a methyl group, an ethyl group, an isopropyl group, a 2-sulfamoylethyl group, a 2-hydroxyethyl group, etc. Examples of the aryl group shown by $Z^4$ are the aryl groups having 6 to 10 carbon atoms, which may have a substituent, such as a phenyl group, an m-hydroxyphenyl group, a p-sulfamoylphenyl group, etc. Also, examples of the amino group substituted by an alkyl group of 1 to 8 carbon atoms are a diethylamino group, a dipropylamino group, an N,N'-di(hydroxyethyl)amino group, etc. The particularly preferred groups shown by $Z^4$ are a methyl group, an ethyl group, and a phenyl group.

L represents a ligand including a dye ligand, such as azo dye ligands and ligands which are not dyes. Preferred examples of L are those azo dye moieties as defined by general formulae (I) and (II), and other popular ligands such as $H_2O$, $Cl^-$, $SO_4^{2-}$, $CH_3COO^-$ and

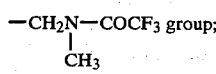

$M^{II}$ represents a metal ion weakly coordinating to the dye ligand moiety as compared to the metal ion contained in a mordant layer and examples of the metal ion are Zn, Pb, Sn, Al, Mn, Zr, Bi, In, etc., and in particular, Zn, Pb and Mn are preferred.

Also, p, q, r and n each is an integer of 0 to 5 and they take a combination such that the charges of the whole chelate dyes become zero. The particularly preferred combination is the $q=1$, $p=0$, $0 \leq n \leq 3$ and $0 \leq r \leq 3$, or $q=1$, $1 \leq p \leq 3$, $0 \leq n \leq 3$ and $r=0$.

The aromatic carbon ring nucleus or heterocyclic nucleus formed by Z, $Z^1$ or $Z^2$ can be substituted with, for example, an unsubstituted or substituted alkyl group wherein the alkyl moiety has 1 to about 6 carbon atoms; an aryl group having 6 to about 10 carbon atoms; a methylsulfonyl group; a phenylsulfonyl group; a

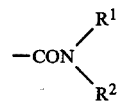

a methylsulfonamide ($-NHSO_2CH_3$) group; a group represented by

wherein $R^1$ and $R^2$ each represents a hydrogen atom, an unsubstituted or substituted alkyl group wherein the alkyl group has 1 to about 6 carbon atoms, or an aryl group having 6 to about 8 carbon atoms, or $R^1$ and $R^2$, when combined together, may form a 5- to 6-membered heterocyclic ring; an $-OR^1$ group wherein $R^1$ has the same meanings as mentioned above; a

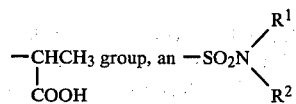

wherein $R^1$ and $R^2$ have the same meanings as above mentioned; a hydroxy group; an $-NH-R^1$ group wherein $R^1$ has the same meanings as above mentioned; an

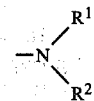

wherein $R^1$ and $R^2$ have the same meanings above mentioned; a nitro group; a trifluoromethylsulfonyl group, an $-NHCOR^1$ group wherein $R^1$ has the same meanings above mentioned; or a chlorine atom.

Furthermore, the feature of the foregoing chelate compound is that the chelate compound contains (1) a carrier component capable of losing the diffusible property, or (2) a ballasted carrier component capable of releasing a diffusible dye when the foregoing silver halide emulsion is developed under an alkaline condition. Hereinafter, the foregoing carrier component is shown by Y.

A preferred embodiment of this invention is a color diffusion transfer photographic film unit having layers each containing a dye-providing material associated with a light-sensitive silver halide emulsion, an image-receiving layer having a metal salt-containing layer adjacent thereto (or a metal salt-containing image-receiving layer), and an alkaline processing composition, wherein the foregoing dye-providing material is the metal chelate compound shown by foregoing general formula (I) and (II) and further the foregoing chelate compound contains (1) a carrier component capable of losing the diffusibility, or (2) a ballasted carrier component capable of releasing a diffusible dye when the foregoing silver halide emulsion is developed under an alkaline condition. It is preferred that the foregoing alkaline processing composition is placed in a means capable of distributing the composition in the photographic unit.

An effective example of Y is the group represented by the following formula (A):

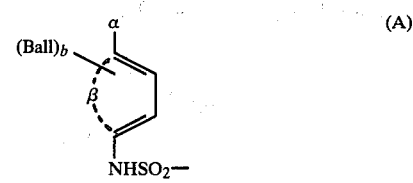

wherein $\beta$ represents a non-metallic atomic group necessary for forming a benzene ring and the benzene ring may form, for example, a naphthalene ring, a quinoline ring, a 5,6,7,8-tetrahydronaphthalene ring, a cumarone ring, etc., by the condensation with a carbon ring or a heterocyclic ring. Furthermore, the foregoing benzene ring or the ring formed by the condensation of a carbon ring or a heterocyclic ring to the benzene ring may have a substituent such as a halogen atom, an alkyl group, an alkoxy group, an aryl group, an aryloxy group, a nitro group, an amino group, an alkylamino group, a heterocyclic group, etc.

In formula (A), α represents a group shown by —OG$^1$ or —NHG$^2$, wherein G$^1$ represents a hydrogen atom or a group forming a hydroxyl group by decomposition such as hydrolysis, preferably a group shown by

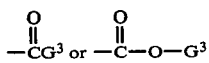

wherein G$^3$ represents an alkyl group, in particular, an alkyl group having 1 to 18 carbon atoms, such as a methyl group, an ethyl group, a propyl group, etc.; a halogen-substituted alkyl group having 1 to 18 carbon atoms, such as a chloromethyl group, of trifluoromethyl group, etc.; a phenyl group; a substituted phenyl group; etc.) and G$^2$ represents a hydrogen atom, an alkyl group having 1 to 22 carbon atoms, or a hydrolyzable group. Preferred examples of the hydrolyzable group shown by G$^2$ are the groups shown by

—SO$_2$G$^5$ or —SOG$^5$ (wherein G$^4$ represents an alkyl group having 1 to 4 carbon atoms, such as a methyl group, an ethyl group, etc.; a halogen-substituted alkyl group such as a mono-, di- or trichloromethyl group, a mono-, di-, or trifluoromethyl group, etc.); an alkylcarbonyl group such as an acetyl group, etc.; an alkyloxy group; a substituted phenyl group such as a nitrophenyl group, a cyanophenyl group, etc.; an unsubstituted phenyloxy group; a phenyloxy group substituted by a lower alkyl group or a halogen atom; an alkyloxycarbonyl group; an aryloxycarbonyl group; an alkylsulfonylethoxy group, or an arylsulfonylethoxy group and G$^5$ represents a substituted or unsubstituted alkyl group or a substituted or unsubstituted aryl group.

Furthermore, b is an integer of 0, 1 or 2, however, when α is a group shown by —OG$^1$ and when α is a group shown by —NHG$^2$ and G$^2$ is a hydrogen atom, an alkyl group having 1 to 8 carbon atoms, or a hydrolyzable group, b is 1 or 2, preferably 1. Ball represents a ballast group, which will be explained later in detail.

Practical examples of Y are described in U.S. Pat. Nos. 2,928,312 and 4,135,929 and Japanese Patent Application (OPI) No. 50736/78.

Other examples of Y include groups represented by the following formula (B):

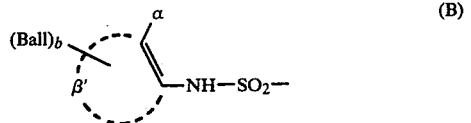

wherein Ball, α, and b have the same significance as defined in formula (A) and β' represents an atomic group necessary for forming a carbon ring such as a benzene ring and the benzene ring may form a naphthalene ring, a quinoline ring, a 5,6,7,8-tetrahydronaphthalene ring, a cumarone ring, etc., by the condensation with a carbon ring or a heterocyclic ring. Furthermore, each of the foregoing condensed rings may have a substituent such as a halogen atom, an alkyl group, an alkoxy group, an aryl group, an aryloxy group, a nitro group, an amino group, an alkylamino group, an arylamino group, an amido group, a cyano group, an alkylmercapto group, a keto group, a carboalkoxy group, a heterocyclic group, etc. Practical examples of Y of this kind are described in U.S. Pat. Nos. 4,053,312 and 4,055,428 and Japanese Patent Application (OPI) Nos. 149328/78, 12642/81, 16130/81 and 16131/81. The groups shown by the following general formula are also useful:

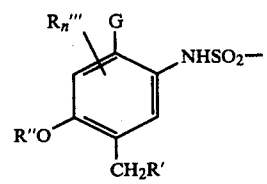

wherein G represents a hydroxyl group or a group providing a hydroxyl group by causing hydrolysis; R' represents an alkyl group or an aryl group; R" represents an alkyl group or an aryl group; R'" represents an alkyl group, an alkoxy group, an alkylthio group, an arylthio group, a halogen atom, or an acylamino group; and n is 0, 1 or 2; said R" and R'" may combine with each other to form a condensed ring; said R' and R" may combine with each other to form a condensed ring; said R' and R'" may combine with each other to form a condensed ring; and the total carbon number of R', R" and R'" is 8 or more.

A still other example of Y is the group represented by the following formula (C):

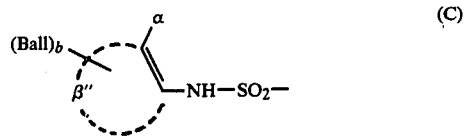

wherein Ball, α, and b have the same significance as defined in formula (A) and β" represents an atomic group necessary for forming a heterocyclic ring such as a pyrazole ring, a pyridine ring, etc., and the heterocyclic ring may be condensed with a carbon ring or a heterocyclic ring or further each of the foregoing rings may have the substituent as described in regard to the substituent for the ring in formula (B). Practical examples of Y of this kind are described in Japanese Patent Application (OPI) No. 104343/76, corresponding to U.S. Pat. No. 4,198,235.

A further example of Y is the group represented by formula (D):

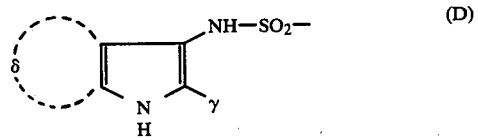

wherein γ represents a hydrogen atom, a substituted or unsubstituted alkyl group, an aryl group, or a heterocyclic group, or a group shown by —CO—G$^6$ (wherein G$^6$ represents —OG$^7$, —S—G$^7$, or

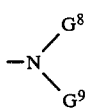

(wherein G⁷ represents a hydrogen atom, an alkyl group, a cycloalkyl group, or an aryl group; said alkyl group, cycloalkyl group, and aryl group may have a substituent; $G^8$ represents the same group as foregoing $G^7$ and also an acyl group induced from an aliphatic or aromatic carboxylic acid or a sulfonic acid; and $G^9$ represents a hydrogen atom or an unsubstituted or substituted alkyl group)) and δ represents a residue necessary for completing a condensed benzene ring; said condensed benzene ring may have one or more substituents; and the substituent of the foregoing condensed benzene ring being a ballast group or a group containing a ballast group. Practical examples of Y of this kind are described in Japanese Patent Application (OPI) Nos. 104343/76, 46730/78 and 130122/79, corresponding to U.S. Pat. Nos. 4,179,291 and 4,273,855.

Another example of Y is the group represented by the following formula (E):

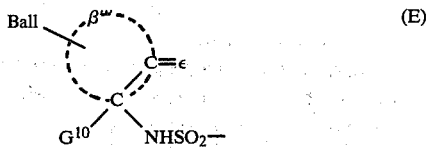

wherein Ball has the same significance as defined in formula (A); ε represents an oxygen atom or a group =NG″ (wherein G″ represents a hydroxyl group or an amino group which may have a substituent); when, in particular, ε is the group =NG″, the typical G″ is the G″ in the group =C=N—G″ formed as the result of the dehydration reaction of a carbonyl reagent, $H_2N$—G″ and a ketone group and as the compound shown by $H_2N$—G″, there are, for example, hydroxylamine, hydrazines, semicarbazides, thiosemicarbazides, etc. Practical examples of these compounds are hydrazine, phenylhydrazine, substituted phenylhydrazines having substituent such as an alkyl group, an alkoxy group, a carboalkoxy group, a halogen atom, etc., at the phenyl group thereof, isonicotinic acid hydrazine, etc. as hydrazines; phenylsemicarbazide, substituted phenylsemicarbazides having a substituent such as an alkyl group, an alkoxy group, a carboalkoxy group, a halogen atom, etc., as semicarbazides; and thiosemicarbazide and substituted thiosemicarbazides (as those of foregoing phenylsemicarbazides) as thiocarbazides.

Also, β‴ in the formula (E) represents a 5-membered, 6-membered, or 7-membered saturated or unsaturated nonaromatic hydrocarbon ring and practical examples are cyclopentanone, cyclohexanone, cyclohexenone, cyclopentenone, cycloheptanone, cycloheptenone, etc.

Furthermore, the 5-, 6- or 7-membered nonaromatic hydrocarbon ring may form a condensed ring by fusing with another ring at a proper position of it. In this case, other ring which forms the foregoing condensed ring with the nonaromatic hydrocarbon ring may be an aromatic or nonaromatic ring or may be a hydrocarbon ring or heterocyclic ring but it is more preferred in this invention that the condensed ring is the condensed ring of the foregoing 5-, 6- or 7-membered nonaromatic hydrocarbon ring and benzene fused with each other, such as, for example, indanone, benzocyclohexenone, benzocycloheptenone, etc.

The foregoing 5-, 6- or 7-membered nonaromatic hydrocarbon ring or the foregoing condensed ring may have one or more substituents such as an alkyl group, an aryl group, an alkyloxy group, an aryloxy group, an alkylcarbonyl group, an arylcarbonyl group, an alkylsulfonyl group, an arylsulfonyl group, a halogen atom, a nitro group, an amino group, an alkylamino group, an arylamino group, an amido group, an alkylamido group, an arylamido group, a cyano group, an alkylmercapto group, an alkyloxycarbonyl group, etc.

$G^{10}$ in the formula (E) represents a hydrogen atom or a halogen atom such as a fluorine atom, a chlorine atom, a bromine atom, etc.

Practical examples of Y of this kind are described in Japanese Patent Application (OPI) No. 3819/78, corresponding to U.S. Pat. No. 4,149,892.

Other examples of Y in this invention are described in, for example, U.S. Pat. Nos. 3,443,939, 3,443,940, 3,628,952, 3,443,943, 3,844,785, etc.

A still further example of Y is the group represented by the following formula (F):

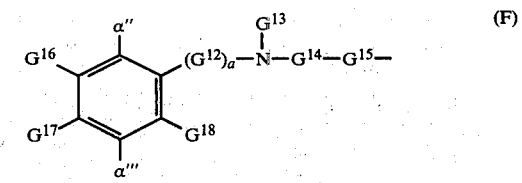

wherein α″ represents an oxidizable nucleophilic group such as a hydroxyl group, a primary amino group, a secondary amino group, a hydroxyamino group, a sulfonamido group or the precursor thereof, and is preferably a hydroxyl group.

α‴ in the formula (F) represents a dialkylamino group or the group as defined in regard to the group α″, and is preferably a hydroxyl group. $G^{14}$ represents a nucleophilic group such as —CO—, —CS—, etc., and is preferably —CO—. $G^{15}$ represents an oxygen atom, a sulfur atom, a selenium atom, a nitrogen atom, etc., and when $G^{15}$ is a nitrogen atom, the nitrogen atom may have a substituent such as a hydrogen atom, an alkyl group or a substituted alkyl group having 1 to 10 carbon atoms, or an aromatic compound residue having 6 to 20 carbon atoms. Preferred $G^{15}$ is an oxygen atom. $G^{12}$ represents an alkylene group having 1 to 3 carbon atoms and a is 0 or 1 and is preferably 0. $G^{13}$ represents a substituted or unsubstituted alkyl group having 1 to 40 carbon atoms or a substituted or unsubstituted aryl group having 6 to 40 carbon atoms, and is preferably an alkyl group.

Also, $G^{16}$, $G^{17}$ and $G^{18}$ each represents a hydrogen atom, a halogen atom, a carbonyl group, a sulfamyl group, a sulfonamido group, an alkyloxy group having 1 to 40 carbon atoms, of the group as defined in regard to $G^{13}$, and $G^{16}$ and $G^{17}$ may form together a 5-, 6- or 7-membered ring. Also, $G^{17}$ may be

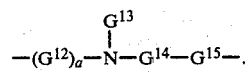

However, at least one of $G^{13}$, $G^{16}$, $G^{17}$ and $G^{18}$ represents a ballast group. Practical examples of Y of this kind are described in U.S. Pat. No. 3,980,479.

As Y suitable for the compounds of this type, there is the group shown by the following formula (G):

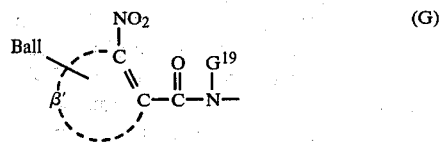

wherein Ball and $\beta'$ have the same significance as defined in regard to formula (B) and $G^{19}$ represents an alkyl group or a substituted alkyl group.

Practical examples of Y of this kind are described in U.S. Pat. Nos. 4,183,753 and 4,142,891.

A further example of effective Y is the group represented by the following formula (H):

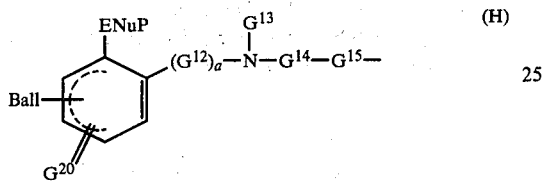

wherein ENuP represents an electron acceptive nucleophilic presursor for a hydroxy nucleophilic group; E represents a carbonyl group or a thiocarbonyl group; $G^{20}$ represents an imido group or the group as defined in regard to ENuP; and $G^{12}$, $G^{13}$, $G^{14}$, $G^{15}$, Ball and a have the same significance as defined in regard to the formula (E).

When $G^{20}$ is the substituting group as defined on ENuP, the following group may bond to the position adjacent thereto:

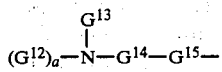

Practical examples of Y of this kind are described in Japanese Patent Application (OPI) No. 110827/78, corresponding to U.S. Pat. No. 4,139,379.

A more preferred group shown by the foregoing formula (H) is the group represented by the following formula (Ha):

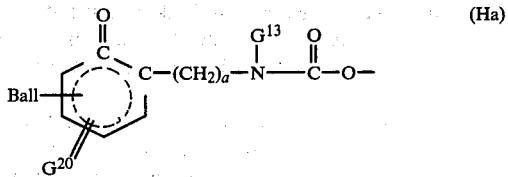

wherein Ball represents a ballast group; a is 0 or 1; and $G^{13}$ represents an alkyl group having 1 to 40 carbon atoms or an aryl group having 6 to 40 carbon atoms.

Practical examples of Y of this kind are described in U.S. Pat. No. 4,139,379.

Another example of Y is the group represented by the following formula (Hb):

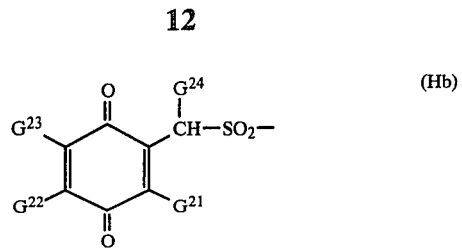

wherein $G^{21}$, $G^{22}$ and $G^{23}$ each represents a hydrogen atom, a halogen atom, an alkyl group, a substituted alkyl group, an alkoxy group, a substituted alkoxy group, an aryl group, a substituted aryl group or an acylamino group, or $G^{22}$ and $G^{23}$ are combined to form a fused ring; $G^{24}$ represents a hydrogen atom, an alkyl group or a substituted alkyl group; and at least one of $G^{21}$, $G^{22}$, $G^{23}$ and $G^{24}$ contains a ballast group.

Practical example of Y of this type includes the following group:

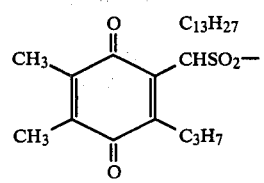

Other examples of general formula (Hb) are disclosed in U.S. Pat. No. 4,232,107 and Japanese Patent Application (OPI) No. 119345/82.

Another example of Y is the group represented by the following formula (I):

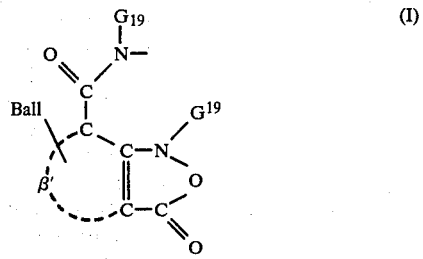

wherein Ball and $\beta'$ have the same significance as defined in regard to the formula (B) and $G^{19}$ has the same significance as defined in regard to foregoing G.

Practical examples of Y of this kind are described in Japanese Patent Application (OPI) Nos. 111628/74, corresponding to U.S. Pat. No. 3,421,964, and 4819/77, corresponding to U.S. Pat. No. 4,199,355.

Furthermore, as the compounds of other type shown by general formula (I) or (II), there are non-diffusible compounds (dye-releasing couplers) releasing a diffusible dye due to the coupling reaction with the oxidation product of a color developing agent formed by the oxidation with silver halide. Typical examples of effective Y for these compounds are described in U.S. Pat. No. 3,227,550. For example, an example of such Y is the group represented by the following formula (J):

wherein Coup represents a coupler residue capable of coupling with the oxidation product of a color developing agent, such as a 5-pyrazolone type residue, a phenol type coupler residue, a naphthol type coupler residue, an indanone type coupler residue, a closed chain ketomethylene type coupler residue, etc., and Ball represents a ballast group. Also, Link represents a group which is bonded to an active point of the Coup moiety and can cleave the bond between the group and the Coup moiety when the dye-providing material shown by general formula (I) or (II) performs a coupling reaction with the oxidation product of a color developing agent, such as an azo group, an azoxy group, —O—, —Hg—, an alkylidene group, —S—, —S—S—, —NH-SO₂, etc. Also, t represents 1 or 2 when Link is an alkylidene group and represents 1 when Link is other group than an alkylidene group.

Preferred examples of group Y shown by foregoing formula (J) are the groups shown by (J) wherein Coup is a phenol type coupler residue, a naphthol type coupler residue, or an indanone type residue and Link is —NHSO₂—.

As the compounds of a still other type shown by general formula (I) or (II), there are compounds (dye developers) which are initially diffusible under an alkaline condition but becomes non-diffusible by being oxidized by development. Examples of Y effective for the compounds of this type are described in U.S. Pat. No. 2,983,606.

Other practical examples of the compounds are described in detail in S. M. Bloom, M. Green, M. Idelson and M. S. Simon, *The Chemistry of Synthetic Dyes*, pages 331–387, 1978, edited by K. Venkataraman, Academic press, New York.

The effective group for Y is N-substituted sulfamoyl groups. As the N-substituent for the N-substituted sulfamoyl groups, a carbon ring group or a heterocyclic ring group is preferred. Particularly preferred examples of the N-carbon ring-substituted sulfamoyl group are the groups shown by foregoing formulae (A) and (B). Also, particularly preferred examples of the N-heterocyclic ring-substituted sulfamoyl group are the groups shown by foregoing formulae (C) and (D).

The term "ballast group" means a group which is bonded to the compound of this invention so that the compound exists in a hydrophilic colloid usually used for photographic materials as a form of a non-diffusible material. The group used for the purpose is preferably organic residues having 8 to 32 carbon atoms. Such organic residues generally contain straight chain or branched aliphatic groups but may be ones containing carbon ring groups, heterocyclic groups, or aromatic groups. The ballast group may be bonded to the compound of this invention directly or indirectly. In the case of indirect bonding, the ballast group may be bonded thereto through —NHCO—, —NHSO₂—, —CONR— (wherein R represents a hydrogen atom, an aryl group, or an alkyl group), —O—, —S—, or —SO₂—.

The diffusibility (non-diffusibility) of a compound depends upon the molecular size of said compound and, hence, when the size of the whole molecule is sufficiently large, a sufficient result is sometimes obtained by using a relatively short group as the ballast group.

As the carrier component for the dye-providing material used in this invention, the DRR compounds shown by foregoing general formulae (A) and (B) are particularly preferred.

Preferred examples of the compounds shown by general formula (I) or (II) include the following wherein examples 1, 5 and 13 are particularly preferred.

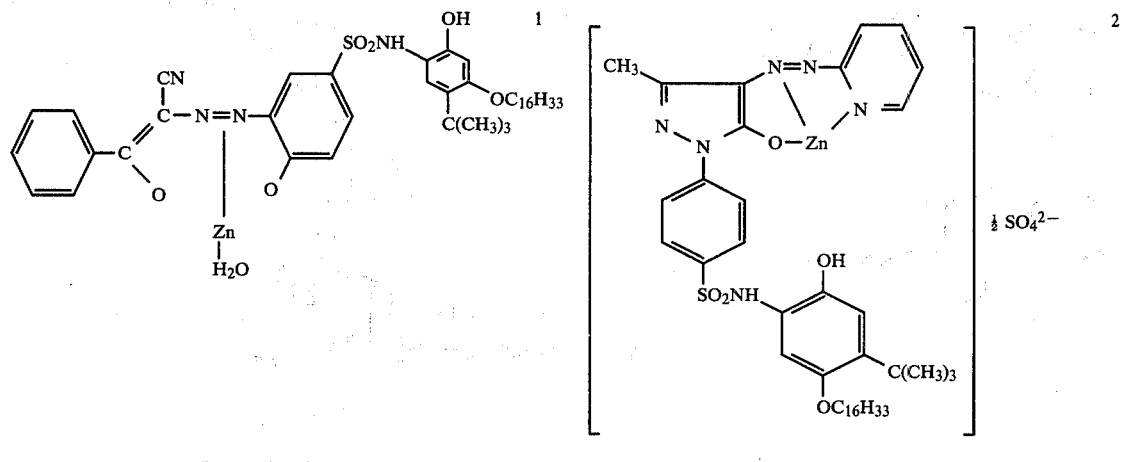

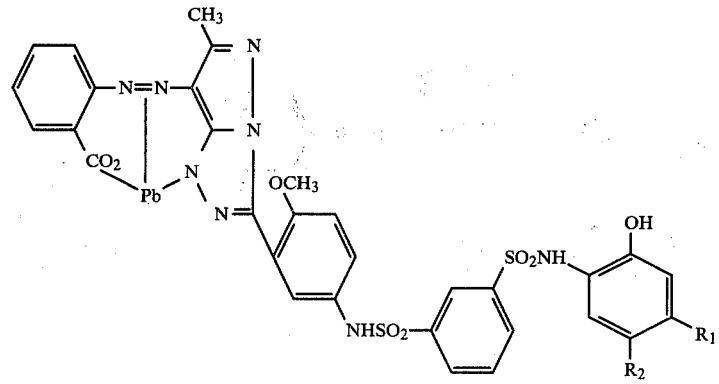

Compound 3 wherein $R_1 = OC_{16}H_{33}$, $R_2 = C(CH_3)_3$
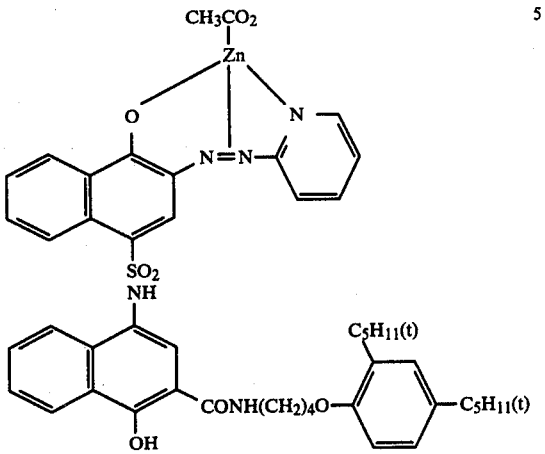
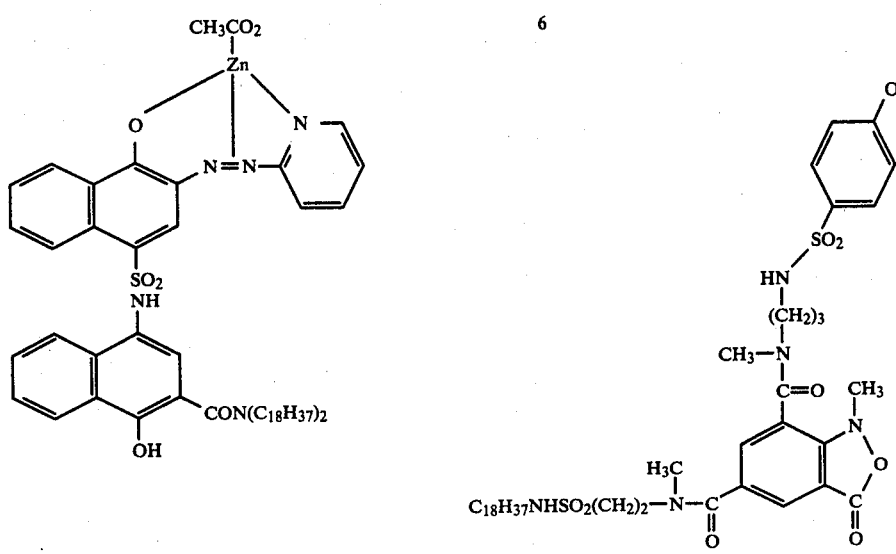
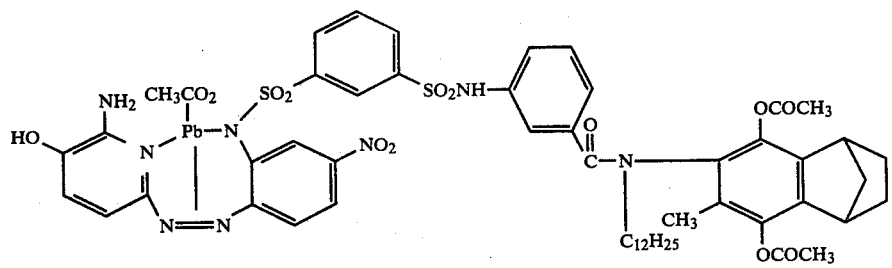

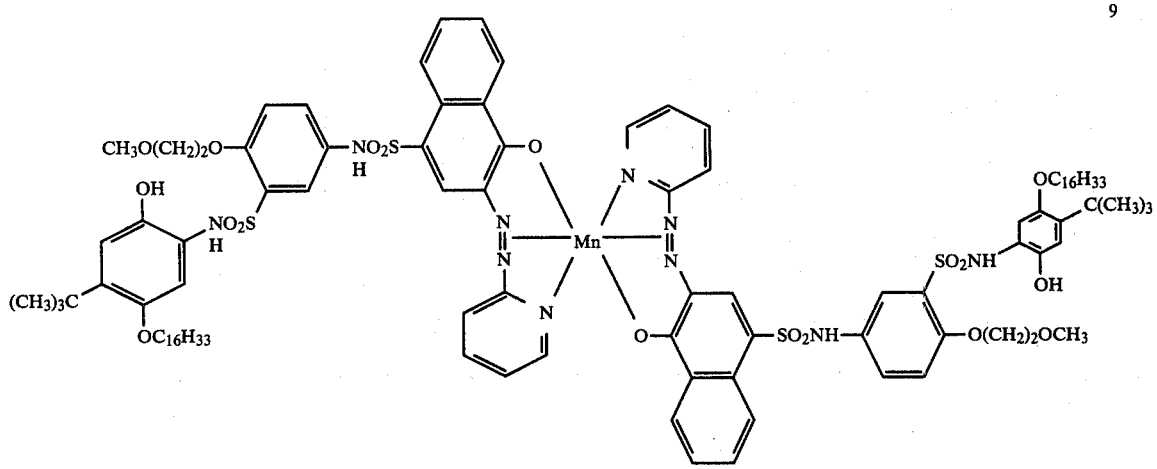
9
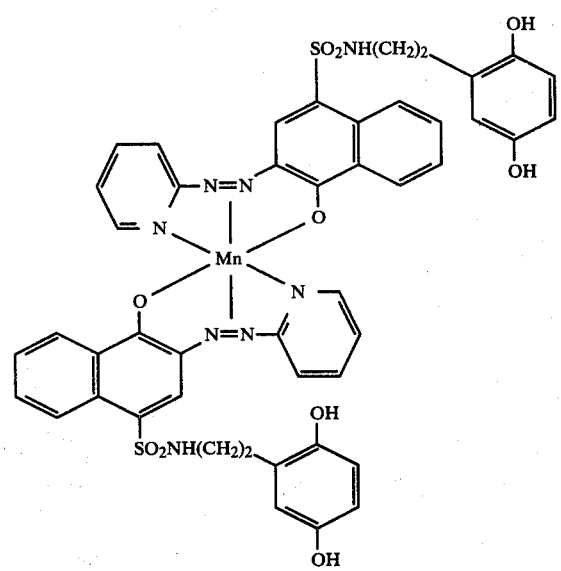
10
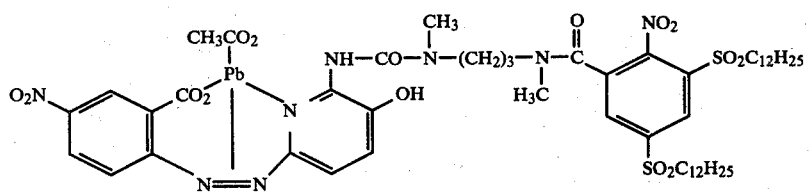
11
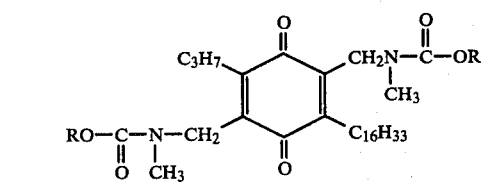
12
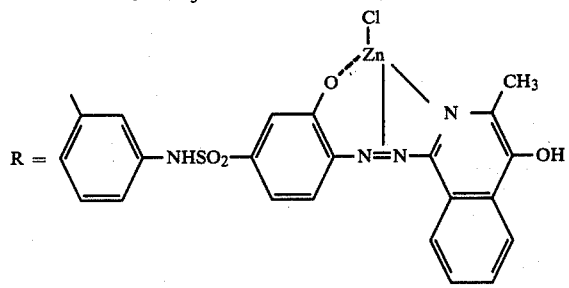

-continued
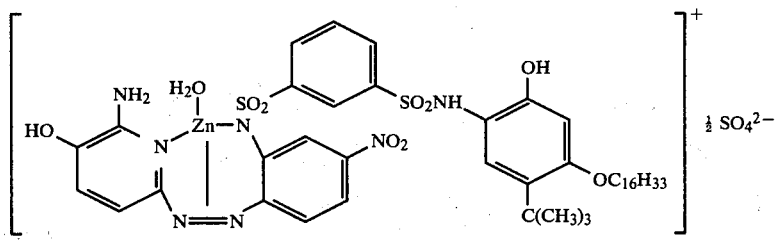
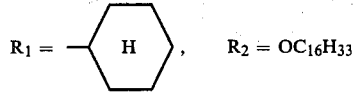
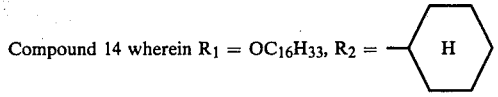
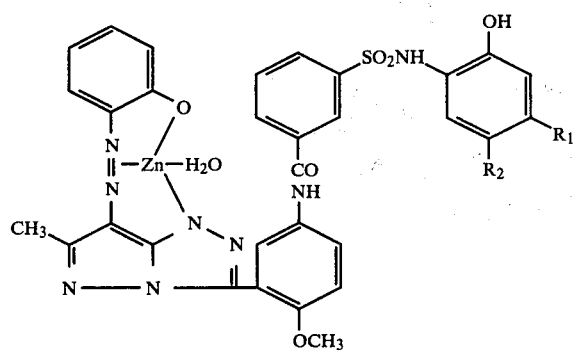
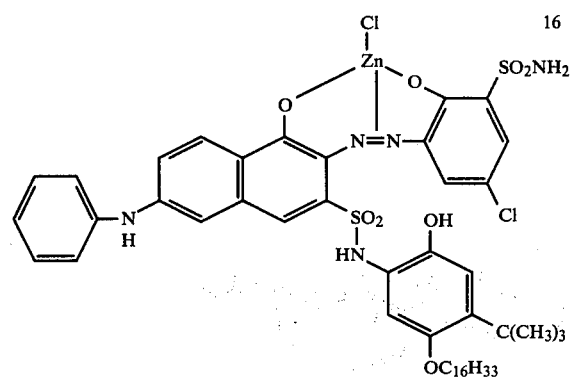
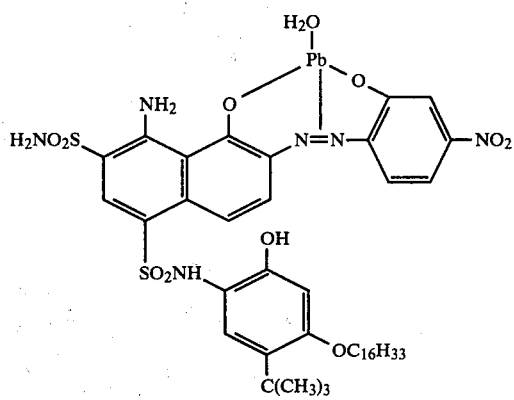
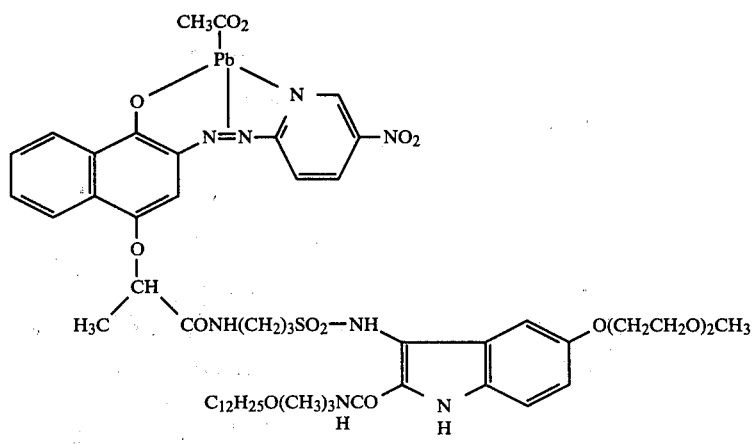

-continued
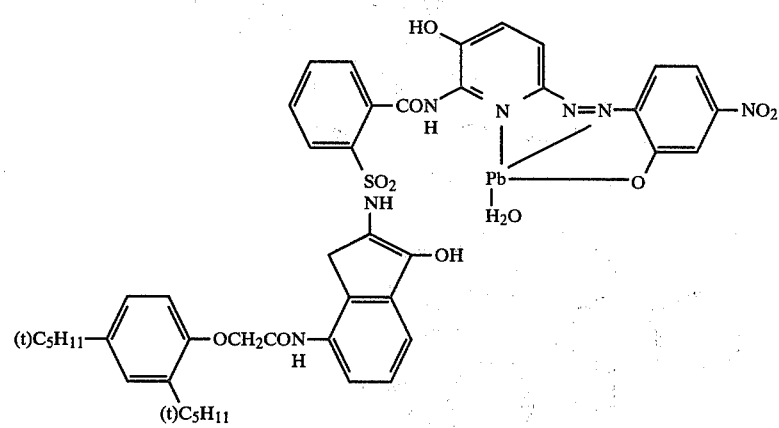
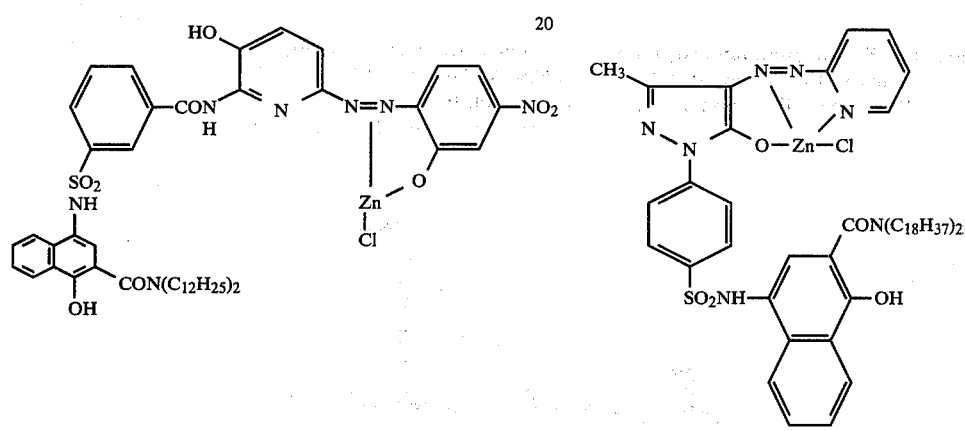
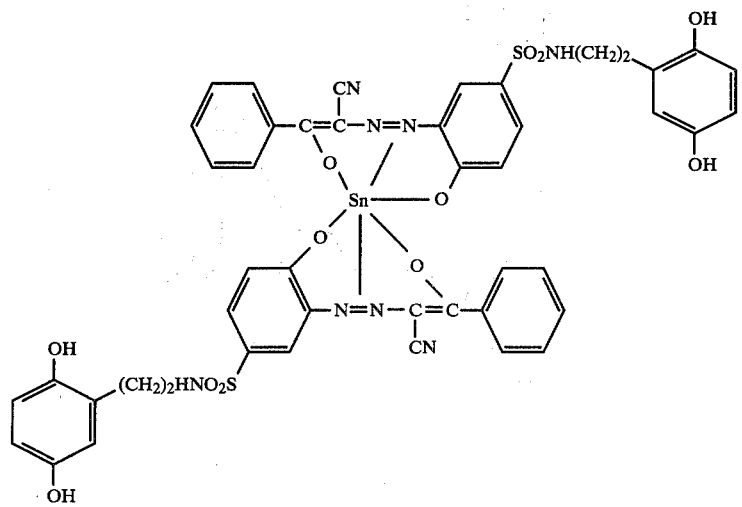

-continued
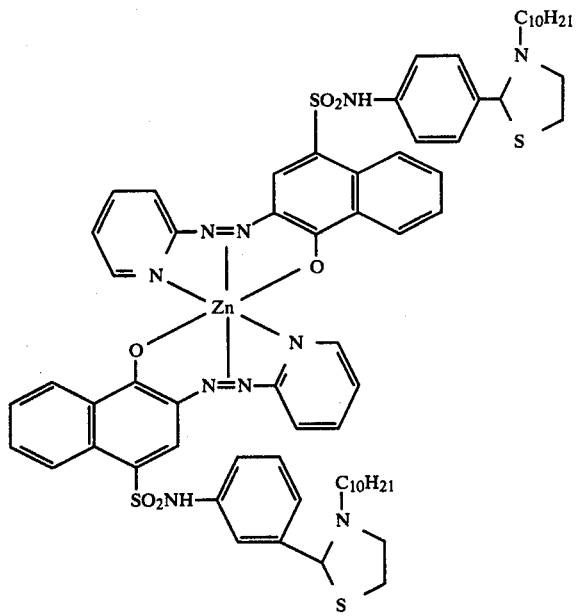
23
The amount of the metal chelate compound (I) or (II) to be used ranges from about $1 \times 10^{-4}$ to about $1 \times 10^{-2}$ mole/m$^2$, preferably $2 \times 10^{-4}$ to $2 \times 10^{-3}$ mole/m$^2$.
Dye-providing materials as disclosed in U.S. Pat. Nos. 4,357,410, 4,357,411, 4,357,412 and 4,346,161 are also useful.
Specific examples thereof are illustrated below:
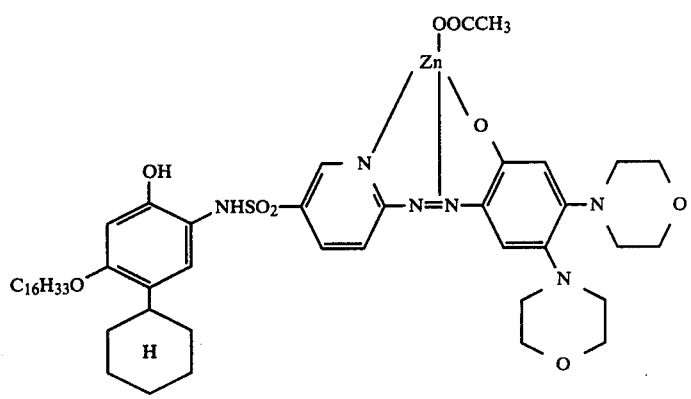
24
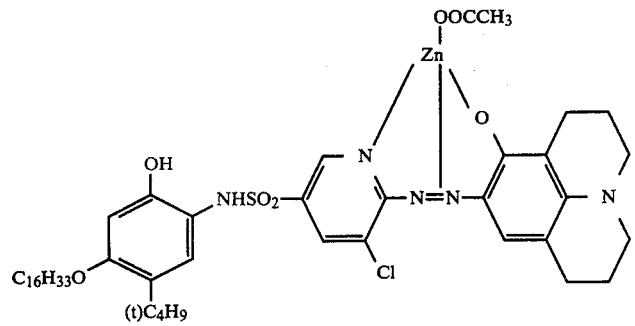
25

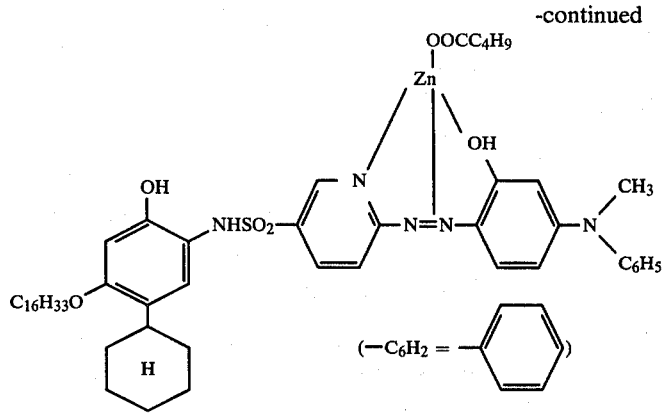

26

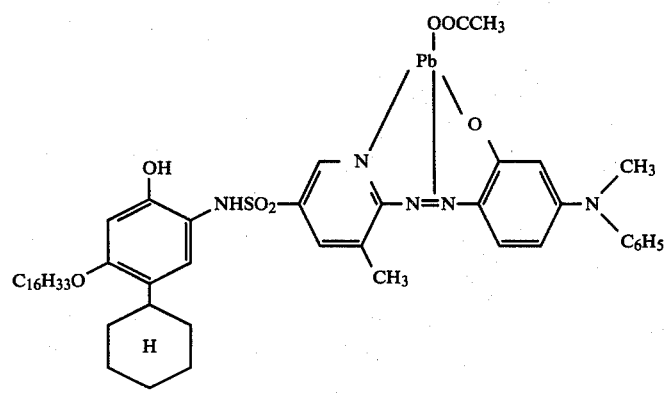

27

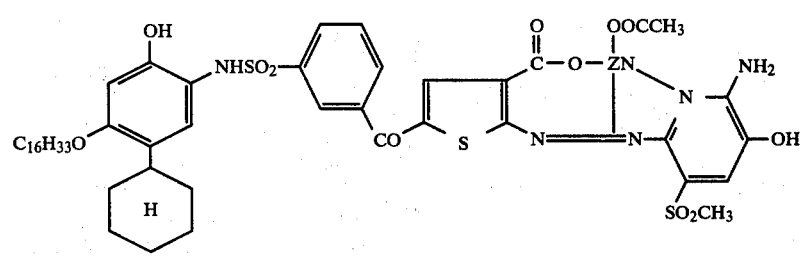

28

The image-receiving layer used in this invention contains a mordant, a metal ion, and, if necessary, a polymer coordinating to the metal ion as an associated form therewith and in this case a polymer having a function as a mordant and a function of coordinating to the metal ion may be used.

As the mordant used in this invention, there are poly-N-vinylimidazole and the quaternarized products thereof; the poly-4-vinylpyridine latexes (particularly, in polyvinyl alcohol) described in U.S. Pat. No. 3,148,061; polyvinyl pyrrolidone described in U.S. Pat. No. 3,003,872; and the polymers containing quaternary ammonium salts or phosphonium salts as described in U.S. Pat. Nos. 3,239,337, 3,547,649, 3,709,690, 3,958,995, 3,770,439 and 3,898,073, and West German Patent Application (OLS) No. 2,264,073. As other examples of the mordant, the basic polymers described in U.S. Pat. Nos. 2,882,156, 3,625,694, 3,709,690, etc., can be effectively used. Still other examples of the effective mordant used in this invention are described in U.S. Pat. Nos. 2,484,430, 3,958,995, 3,271,147, 3,184,309, 3,271,147, 4,124,386, 3,958,995, 4,154,615, 4,142,899, 4,186,014, 4,080,346, 4,131,469, 4,147,548, 4,124,388, 4,193,795, 4,168,976, 4,206,279, and 4,201,840, Japanese Patent Application (OPI) Nos. 126027/79 and 145529/79 and British Pat. Nos. 2,018,452, 2,042,751A, 2,042,752A, etc.

Also, the metal ion contained in the image-receiving layer used in this invention is a metal ion which is substantially colorless in the image-receiving layer, does not give bad influences on silver halide emulsion, and easily reacts with the dye diffused into the image-receiving layer to form a stable chelate dye having a desired hue, which is stable to heat, light and other chemicals existing therein.

For example, there are ions such as Cu (II), Ni (II) and Pb (II). Ni (II) is particularly preferred. In this case, also, as the central metal ($M^{II}$) in the metal chelate compound which is used in the associated form therewith, Zn, Pb and Mn are particularly preferred. The metal ion may be added solely or together with a proper ligand as a metal complex (e.g., [Ni (II)-trinitroacetic acid]complex, [Ni (II)-ethylenediamine]complex, etc.).

As the polymers which can be contained in the image-receiving layer associated with the mordants, there are the polymers described in Japanese Patent Application (OPI) Nos. 48210/80 and 109212/81 and 129346/80 and U.S. Pat. No. 4,273,853 as well as other desired anionic polymers and polymers containing a primary amine, secondary amine, or tertiary amine.

The light-sensitive silver halide emulsions used in this invention are hydrophilic colloid dispersions of silver chloride, silver bromide, silver chlorobromide, silver iodobromide, silver chloroiodobromide, or a mixture of them. The halogen composition is selected according to the purpose and processing conditions of the light-sensitive material and silver bromide, silver iodobromide, or silver chloroiodobromide containing less than 10 mole% iodide and less than 30 mole% chloride is particularly preferred.

In this invention, a negative type silver halide emulsion forming a surface latent image or a direct reversal type silver halide emulsion can be used. As the latter type silver halide emulsion, there are an internal latent image type silver halide emulsion and a pre-fogged direct reversal silver halide emulsion.

The internal latent image type silver halide emulsion is advantageously used in this invention and as the silver halide emulsion of this type, there are the conversion type silver halide emulsions, core-shell type silver halide emulsions, silver halide emulsions containing a different metal described in, for example, U.S. Pat. Nos. 2,592,250, 3,206,313, 3,447,927, 3,761,276, 3,935,014, etc.

The silver halide emulsion used in this invention can have, if desired, a color sensitivity expanded by a spectral sensitizing dye. As the spectral sensitizing dyes, cyanine dyes, merocyanine dyes, etc., may be properly used.

In the case of using DRR compounds in this invention, any silver halide developing agents, which can cross-oxidize the DRR compounds can be used. Such a developing agent may be incorporated in an alkaline processing composition (processing element) or in a proper layer of the light-sensitive element. Examples of the developing agent used in this invention are hydroquinone, aminophenol (e.g., N-methylaminophenol), 1-phenyl-3-pyrazolidone, 1-phenyl-4,4-dimethyl-3-pyrazolidone, 1-phenyl-4-methyl-4-oxymethyl-3-pyrazolidone, N,N-diethyl-p-phenylenediamine, 3-methyl-N,N-diethyl-p-phenylenediamine, 3-methoxy-N-ethoxy-p-phenylenediamine, etc.

In the foregoing developing agents, a black-and-white developing agent having a property of reducing the formation of stain in the mordant layer is particularly preferred.

In the case of using a direct reversal type silver halide emulsion as the light-sensitive silver halide emulsion in this invention, a direct positive image can be obtained by, after image-exposure, developing the emulsion layer or layers in the presence of a fogging agent or by, after image-exposure, applying overall exposure to the emulsion layer or layers (high illuminance and short exposure time, e.g., a shorter exposure than $10^{-2}$ sec., or low illuminance and long exposure time) during surface development process as described in U.S. Pat. No. 2,456,953 (Knott and Stevens). The use of a fogging agent is more preferred since the fogging extent can be easily controlled. The fogging agent may be incorporated in the light-sensitive material or in the developer but it is preferred that the fogging agent be incorporated in the light-sensitive material.

Typical examples of the fogging agent used in this invention are the hydrazines described in U.S. Pat. Nos. 2,588,982 and 2,568,785; hydrazide and hydrazone described in U.S. Pat. No. 3,227,552; and the quaternary salt compounds described in British Pat. No. 1,283,835, Japanese Patent Publication No. 38164/74 and U.S. Pat. Nos. 3,734,738, 3,719,494 and 3,615,615.

Furthermore, a transferred positive image can be obtained by the DIR reversal silver halide emulsion system as described in U.S. Pat. Nos. 3,227,551, 3,227,554 and 3,364,022 or the reversal silver halide emulsion system by dissolution physical development as described in British Pat. No. 904,364. A series of processes for obtaining color diffusion transfer images are described in U.S. Pat. Nos. 3,227,550 and 3,227,552 and British Pat. No. 1,330,524.

Typical examples of the color developing agent in the case of using diffusible dye-releasing type couplers (DDR couplers) in this invention are the p-phenylenediamine derivatives described in U.S. Pat. Nos. 3,227,552, 2,559,643 and 3,813,244. Furthermore, the p-aminophenol derivatives as described in Japanese Patent Application (OPI) No. 26134/73 can be advantageously used as the color developing agent.

The photographic recording material of this invention has a support which does not cause severe dimensional change during processing. As examples of such a support, there are a cellulose acetate film, a polystyrene film, a polyethylene terephthalate film, a polycarbonate film, etc., generally used for photographic light-sensitive materials. Another example of an effective support is a paper or a paper laminated by a water-impermeable polymer such as polyethylene on the surface or surfaces thereof.

Typical examples of the preferred acid materials forming the neutralizing layer used in this invention are described in U.S. Pat. Nos. 2,983,606, 2,584,030, 3,362,819, 3,765,885 and 3,189,371 and French Pat. No. 2,290,699. Practical examples of the acid materials are polymethacrylic acid, various copolymers of acrylic acid and methacrylic acid at various copolymerization ratios, various copolymers of acrylic acid or methacrylic acid and other vinylic monomer (e.g., acrylic acid esters, methacrylic acid esters, vinyl ethers, acrylamides, methacrylamides, etc.), at various copolymerization ratios (preferably 50 to 90 mole% in the content of acrylic acid or methacrylic acid), etc., in particular, polyacrylic acid and an acrylic acid-butyl acrylate copolymer are preferred. The neutralizing layer may further contain a polymer such as cellulose nitrate, polyvinyl acetate, etc., in addition to the acid material and may further contain a plasticizer as described in U.S. Pat. No. 3,557,237. As described in West German Patent Application (OLS) No. 2,038,254, the acid material may be incorporated in the film unit after being microcapsulized.

For obtaining images having necessary and sufficient density after exposure and spreading a processing solution, it is preferred that a timing layer is formed between the neutralizing layer and the silver halide emulsion layer of the photographic recording material used in this invention.

Preferred examples of the timing layer are a timing layer composed of a mixture of cellulose acetate and a maleic anhydride copolymer described in U.S. Pat. Nos. 4,029,849 and 4,056,394 or composed of a homopolymer or copolymer of hydoxyethyl acrylate or methacrylate described in Japanese Patent Publication 46496/77 the timing layer described in U.S. Pat. No. 3,421,893, and the timing layers described in U.S. Pat. Nos. 4,056,394, 4,199,362, 4,201,587, and 4,229,516 and British Pat. No. 2,038,493A, etc., solely or as a double layer with the foregoing timing layer. If necessary, the timing layers described in U.S. Pat. No. 4,148,653 and West German Patent Application (OLS) No. 2,910,271 can be used.

The alkaline processing composition used in this invention is a liquid composition containing processing components necessary for developing silver halide emulsions and forming diffusion transfer dye images and the solvent is mainly water. The processing composition contains, as the case may be, a hydrophilic solvent such as methanol, methyl cellosolve, etc., in addition to the foregoing components.

The processing composition contains an alkali in an amount sufficient for keeping the necessary pH for causing the development of silver halide emulsions and for neutralizing the acid (e.g., a hydrohalogenic acid such as hydrobromic acid, etc., or a carboxylic acid such as acetic acid, etc.) formed during development and various steps for forming dye images. As the alkali used in this invention, there are alkali metal or alkaline earth metal salts such as lithium hydroxide, sodium hydroxide, potassium hydroxide, a calcium hydroxide dispersion, tetramethylammonium hydroxide, sodium carbonate, sodium trisodiumphosphate, etc., and amines such as diethylamine, etc. It is preferred that the processing composition contains an alkali at a concentration giving a pH higher than about 12, particularly higher than 14 at room temperature. More preferably, the processing composition further contains a hydrophilic polymer such as high molecular weight polyvinyl alcohol, hydroxyethyl cellulose, sodium carboxymethyl cellulose, etc. Such a polymer not only gives a viscosity of higher than 1 poise, preferably of about 500 to 1,000 poises at room temperature to the processing composition and facilitates uniform spreading of the processing composition at processing but also forms a non-fluidable film to assist the film unit becoming a unitary body after processing when the processing composition is concentrated by the transfer of the aqueous medium in the processing composition into the photographic recording material during processing. The polymer film can aid in preventing changes of images by inhibiting further transferring coloring components into the image-receiving layer after substantially finishing the formation of the diffusion transfer dye images.

It is, as the case may be, advantageous that the processing composition further contains a light-absorbing material such as $TiO_2$, carbon black, a pH indicating dye, etc., for preventing the silver halide emulsions from being exposed to external light during processing and the desensitizer as described in U.S. Pat. No. 3,579,333. Furthermore, the processing composition may further contain a development inhibitor such as benzotriazole.

It is preferred that the foregoing processing composition be used in the rupturable container as described in U.S. Pat. Nos. 2,543,181, 2,643,886, 2,653,732, 2,723,051, 3,056,491, 3,056,492, 3,152,515, etc.

The photographic element of this invention may further contain a dispersion of a water-insoluble or sparingly soluble synthetic polymer in the light-sensitive silver halide emulsion layer or layers or other hydrophilic colloid layer or layers for improving the dimensional stability. Examples of these polymers are the polymers composed of monomer components such as, for example, alkyl (meth)acrylate, alkoxyalkyl (meth)acrylate, glycidyl (meth)acrylate, (meth)acrylamide, vinyl ester (e.g., vinyl acetate), acrylonitrile, olefin, styrene, etc., solely or as a combination of them or combinations thereof with acrylic acid, methacrylic acid, $\alpha,\beta$-unsaturated dicarboxylic acid, hydroxyalkyl (meth)acrylate, sulfoalkyl (meth)acrylate, styrenesulfonic acid, etc. Practical examples of the polymers used in this invention are described in U.S. Pat. Nos. 2,376,005, 2,739,137, 2,853,457, 2,853,457, 3,062,674, 3,411,911, 3,488,708, 3,525,620, 3,607,290, 3,635,715 and 3,645,740 and British Pat. Nos. 1,186,699 and 1,307,373.

Still further, the photographic elements of this invention may contain various surface active agents for various purposes of improving coating property, antistatic property, slipping property, emulsion-dispersing property, adhesion prevention, and photographic properties (e.g., development acceleration, contrast, sensitization, etc.) in the light-sensitive silver halide emulsion layers or other hydrophilic colloid layers.

Examples of the surface active agents are nonionic surface active agents such as saponin (steroid series), alkylene oxide derivatives (e.g., polyethylene glycol, polyethylene glycol/polypropylene glycol condensation products, polyethylene glycol alkyl ethers, polyethylene glycol alkylaryl ethers, polyethylene glycol esters, polyethylene glycol sorbitan esters, polyalkylene glycol alkylamines, polyalkylene glycol alkylamides, polyethylene oxide addition product of silicone, etc.), glycidol derivatives (e.g., polyglyceride alkylsuccinate, alkylphenyl polyglyceride, etc.), fatty acid esters of polyhydric alcohols, alkyl esters of sugar, etc.; anionic surface active agents having acid groups (e.g., a carboxyl group, a sulfo group, a phospho group, a sulfiric acid ester group, s phosphoric acid ester group, etc.), such as alkylcarboxylates, alkylsulfonates, alkylbenzenesulfonates, alkylnaphthalenesulfonates, alkylsulfuric acid esters, alkylphosphoric acid esters, N-acyl-N-alkyltaurines, sulfosuccinic acid esters, sulfoalkyl polyoxyethylene alkylphenyl ethers, polyoxyethylene alkylphosphoric acid esters, etc.; amphoteric surface active agents such as amino acids, aminoalkylsulfonic acids, aminoalkylsulfuric acid esters, aminoalkylphosphoric acid esters, alkylbetaines, amine oxides, etc.; and cationic surface active agents such as alkylamine salts, aliphatic or aromatic quaternary ammonium salts, heterocyclic quaternary ammonium salts (e.g., pyridinium, imidazolium, etc.), and phosphonium or sulfonium salts containing aliphatic or heterocyclic ring.

When preparing the photographic element of this invention, the light-sensitive silver halide emulsion layers and other layers can be formed on a support or other layer by various known coating methods, such as a dip coating method, a roller coating method, a curtain coating method, an extrusion coating method, etc. The coating methods described in U.S. Pat. Nos. 2,681,294, 2,761,791 and 3,526,528 are also useful for the formation of the foregoing layers.

The chelate dye-providing material in this invention is, after being emulsion-dispersed and further washed with water for removing auxiliary solvent, coated on a support together with a light-sensitive silver halide emulsion or a mordant associated with a metal salt and said dye-providing material does not change during these steps and also does not change during the preservation of the films thus prepared.

When the film thus-prepared is image-exposed and treated with the alkaline processing composition by a combination of the composition with a means for releasing the composition in the film, the mobilized dye moiety of the dye-providing material thus-released is transferred into the mordant layer and at the same time is converted into a chelate dye to which the metal ion associated with the mordant layer is coordinated. This reaction is, for example, considered to occur as shown in the following formula:

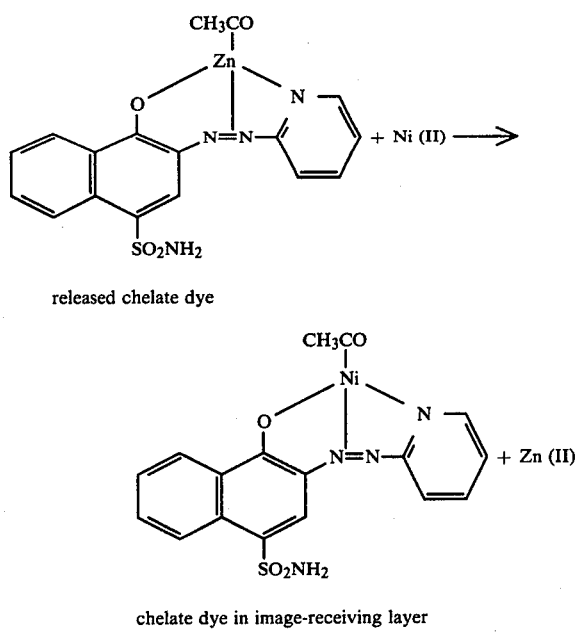

released chelate dye chelate dye in image-receiving layer

The exchange of the central metal ion of the chelate dye shown by the foregoing formula may take place as follows:

(a) When the chelate dye-providing material is brought into contact with the alkaline processing composition, the decoordination of the chelate dye-providing material immediately occurs and the dye ligand moiety causes a chelating reaction with the metal ion (e.g., Ni (II) ion) associated with the image-receiving layer to form the chelate dye in the image-receiving layer.

(b) When the oil-dispersed and immobilized dye-providing material is brought into contact with the alkaline processing solution, the decoordination of the metal ion (e.g., Zn (II) ion) does not occur but the movable dye released from the dye-providing material immediately causes the decoordination of the metal ion and forms in the image-receiving layer with the metal ion associated with the image-receiving layer.

(c) The dye moiety released from the dye-providing material does not cause the decoordination by the alkaline processing composition but simultaneously when the dye moiety reaches the image-receiving layer, it causes the change of a metal ion with the metal ion (e.g., Ni (II) ion) associated with the image-receiving layer.

Practical synthesis examples of the metal chelate compounds used in this invention are illustrated below.

SYNTHESIS EXAMPLE 1

Synthesis of Compount 6

(1) Synthesis of 4-hydroxy-3-(2-pyridylazo)-1-naphthalenesulfonic acid:

In a mixture of 500 ml of water and 250 ml of concentrated hydrochloric acid was dissolved 26 g of sodium 1,2-naphthoquinone-4-sulfonate and then 11 g of 2-pyridyl hydrazone dissolved in 100 ml of water was added to the solution thus-prepared. The mixture was stirred for 1 hour and after cooling the reaction mixture, the product was collected by filtration and washed with a small amount of water and then acetone. The amount of the product was 31 g (yield of 93%), and having an m.p. of over 300° C., $\lambda_{max}^{MeOH}$ 476 nm (2) Synthesis of 4-hydroxy-3-(2-pyridylazo)-1-naphthalenesulfonyl chloride:

In 200 ml of acetonitrile was dissolved 20 g of 4-hydroxy-3-(2-pyridylazo)-1-naphthalenesulfonic acid and after adding 25 ml of phosphorus oxychloride and 5 ml of dimethyl acetamide to the solution, the mixture was stirred for 2 hours at 60° C. The reaction mixture thus-obtained was poured into 1.5 liters of ice-water and crystals thus-precipitated were collected by filtration. The amount of the product was 20 g (yield of 96%), and an m.p. of over 300° C., $\lambda_{max}^{chloroform}$ 472 nm.

(3) Synthesis of N-[3'-(N',N'-dioctadecylcarbamoyl)-4'-hydroxy-1'-naphthyl]-4-hydroxy-3-(2-pyridylazo)-1-naphthalenesulfonamide:

In 235 ml of dimethylacetamide was dissolved 46 g of 4-amino-N,N-dioctadecyl-1-hydroxy-2-naphthamide ½ sulfate and then 15.5 ml of pyridine was added to the solution in a nitrogen atmosphere. After stirring the mixture for 15 minutes, 22 g of 4-hydroxy-3-(2-pyridylazo)-1-naphthalene sulfonyl chloride was added thereto in several parts. After stirring the mixture for 2 hours, 340 ml of ethyl acetate and 680 ml of water were added to the reaction mixture and after stirring the resultant mixture slowly, the aqueous layer formed was removed by decantation. The ethyl acetate layer was washed with 680 ml of water and dried by magnesium sulfate. Then, ethyl acetate was distilled off and the residue was recrystallized from isopropyl alcohol. The amount of the product was 18.5 g (yield of 50%) and the melting point was 105°–110° C.

(4) Synthesis of Illustrated Compound 6:

In 90 ml of dimethylformamide was dissolved 9.0 g of the azo dye obtained in foregoing process (3) and to the solution was added 1.94 g of zinc acetate dissolved in 10 ml of dimethylformamide. After stirring the mixture for 30 minutes, the dye solution thus-obtained was poured to 1 liter of water. The crystals thus-precipitated were collected by filtration and washed thrice with water. The amount of the product after vacuum drying was 9.7 g (yield of 96%) and the melting point was 118°–123° C.

SYNTHESIS EXAMPLE 2

Synthesis of Compound 13

(1) Synthesis of 2'-amino-4'-nitromethanesulfonanilide:

In 1 liter of pyridine was dissolved 60 g of 4-nitro-o-phenylenediamine and then 46 g of methanesulfonyl chloride was slowly added to the solution at a temperature lower than 10° C. in a nitrogen atmosphere. After 4 hours, the reaction mixture was poured into 6 liters of ice-water. The crystals thus-precipitated were collected by filtration and washed thrice with water. The amount of the product after drying at reduced pressure was 75 g (yield of 81%).

(2) Synthesis of 2'-amino-3-fluorosulfonyl-N-methanesulfonamido-4'-nitrobenzenesulfonanilide:

In 1.7 liters of tetrahydrofuran was dissolved 72 g of 2'-amino-4'-nitrobenzenesulfonanilide and then 31 g of triethylamine was added to the solution. Thereafter, 92 g of m-fluorosulfonylbenzenesulfonyl chloride dissolved in 100 ml of tetrahydrofuran was added to the solution and after stirring the mixture for 4 hours at about 10° C., the reaction mixture thus-obtained was poured into 7 liters of ice-water. The crystals thus-precipitated were collected by filtration and washed thrice with water. The amount of the product after air-drying was 137 g (yield of 97%).

(3) Synthesis of 2-amino-6-[2-(3-fluorosulfonyl-N-methanesulfonylbenzenesulfonamido)-4-nitrophenylazo]-3-pyridinol:

After adding 10 g of sodium nitrite to 66 ml of concentrated sulfuric acid, the mixture was stirred for 30 minutes at 70° C. The solution was cooled below 0° C. and 250 ml of a mixture of propionic acid and acetic acid (¼) was added to the solution so that the temperature of the solution did not become higher than 15° C. Then, 60 g of the foregoing sulfonanilide was added to the mixture in several equal parts. After stirring the mixture for 3 hours, the solution thus-obtained was slowly added to a solution of 150 ml of methyl cellosolve having dissolved therein 60 g of 2-aminopyridinol at a temperature below 10° C. Then, after stirring the mixture for 2 hours, the reaction mixture thus-obtained was poured into 3 liters of ice-water. The crystals thus-precipitated were collected by filtration and to the wet solids was added 1.35 liters of a mixture of acetonitrile and methanol (2/1) to form a slurry, which was washed by refluxing for 20 minutes. After cooling the reaction mixture, the crystals thus-formed were collected by filtration. The amount of the product was 21 g (yield of 28%).

(4) Synthesis of 2-amino-6-[2-(3-sulfobenzenesulfonamido)-4-nitrophenylazo]-3-pyridinol potassium salt:

To 50 ml of an aqueous solution containing 6 g of potassium hydroxide was added 5 g of 2-amino-6-[2-(3-fluorosulfonyl-N-methanesulfonylbenzenesulfonamido)-4-nitrophenylazo]-3-pyridinol and the mixture was stirred for 1 hour. Then, 10 ml of concentrated sulfuric acid was added to the mixture and crystals thus-precipitated were collected by filtration. The amount of the product after vacuum drying was 6 g (yield of 93%).

(5) Synthesis of 2-amino-6-[2-(3-chlorosulfonylbenzenesulfonamido)-4-nitrophenylazo]-3-pyridinol:

To 50 ml of acetonitrile was added 6 g of 2-amino-6-[2-(3-sulfo-N-methanesulfonylazo]-3-pyridinol potassium salt and then to the solution was added drop-wise 6 ml of phosphorus oxychloride at 45° C. After stirring the mixture for 1 hour, the reaction mixture thus-obtained was poured into 300 ml of ice-water. The crystals thus-precipitated were collected by filtration and air-dried. The amount of the product was 4.2 g (yield of 80%).

(6) Synthesis of 2-amino-6-[{2-[N-(5'-tert-butyl-4'-hexadecyloxy-2'-hydroxyphenyl)sulfamoyl]benzenesulfonamido}-4-nitrophenylazo]-3-pyridinol:

After adding 1.75 g of 2-amino-4-tert-butyl-5-hexadecyloxy-1-phenol to 15 ml of dimethylacetamide, 1.8 ml of pyridine was added to the mixture in nitrogen atmosphere. To the solution thus-formed was added 2.3 g of 2-amino-6-[2-(3-chlorosulfonylbenzenesulfonamido)-4-nitrophenylazo]-3-pyridinol and the resultant mixture was stirred for 30 minutes. The reaction mixture was poured in 150 ml of water and the crystals thus-precipitated were collected by filtration and washed twice with water. After drying, the product was purified by silica gel column chromatography. The amount of the product was 0.8 g (yield of 21%), m.p. 70° to 85° C.

(7) Synthesis of Illustrated Compound 13:

In 10 ml of dimethylformamide was dissolved 0.80 g of the azo dye obtained in process (6). To the solution thus-obtained was added a solution of 0.17 g of zinc sulfate dissolved in 4 ml of dimethylformamide and after stirring the mixture for 30 minutes, the dye solution thus-formed was poured in 100 ml of water. The crystals thus precipitated were collected by filtration and washed thrice with water. The amount of the product after vacuum drying was 0.86 g (yield of 94%).

REFERENCE EXAMPLE 1

Image-receiving elements A and B containing Ni ion and having the following layer structures were prepared. In the structures, the numerals in the parentheses are the coated amounts of components in $g/m^2$.

Image-Receiving Element A:
Gelatin (1.0)
$TiO_2$ (20), gelatin (3.0)
Poly(vinylpyridine) (3.0), gelatin (3.0)
Nickel acetate (0.35), gelatin (1.0)
Poly(ethylene terephthalate) support Image-Receiving Element B:
Gelatin (1.0)
$TiO_2$ (20), gelatin (3.0)
Poly(acrylamide-sodium co-N-vinylbenzyliminodiacetate) (80:20 by weight ratio) (1.15)
Poly-divinylbenzene-co-styrene-co-N-benzyl-N,N'-dimethyl-N-vinylbenzyl ammonium chloride (1:49.5:49.5) (3.0), nickel acetate (0.35), gelatin (3.0)
Poly(ethylene terephthalate) support Also, image-receiving element C having the same layer structure as image-receiving element A except that the element did not contain nickel acetate was prepared.

On each of the image-receiving elements A, B and C thus-prepared was coated a dispersion prepared by dissolving 0.8 g of Compound 5 of this invention in 0.4 g of tricresyl phosphate and dispersing the solution in an aqueous gelatin solution to form coated layers A-(I)', B-(I)' and C-(I)'.

Also, for comparison, a known non-chelate compound having the following structure M-1 corresponding to the compound of this invention was coated on the foregoing image-receiving elements A, B and C by the same manner as above to form coated layers A-(II)', B-(II)', and C-(II)'.

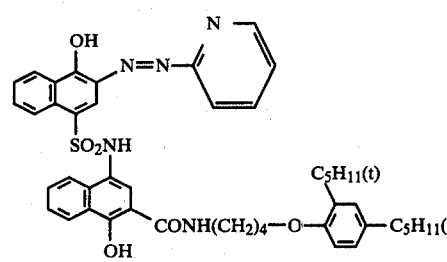

M-1

The reflection spectrum of each coated layer thus-formed at the side of the dye-providing material layer was measured, the results being shown in Table 1.

TABLE 1

| Dye-Providing Material | Image-Receiving Layer A (Ni ion weakly fixed) | | Image-Receiving Layer B (Ni ion strongly fixed) | | Image-Receiving Layer C (No Ni ion) | |
|---|---|---|---|---|---|---|
| | Coated Layer | Absorption Maximum | Coated Layer | Absorption Maximum | Coated Layer | Absorption Maximum |
| Compound 5 (this invention) | A-(I)' | 536 nm, 570 nm | B-(I)' | 536 nm, 570 nm | C-(I)' | 536 nm, 570 nm |
| Compound M-1 (comparative) | A-(II)' | 540 nm, 580 nm | B-(II)' | 482 nm (shoulder at 550 nm) | C-(II)' | 482 nm |

The known compound M-1 used as a comparative example showed a slight change even in the case of coating on the image-receiving element B to which the Ni ion was strongly fixed as compared to the case of coating on the image-receiving element C containing no Ni ion, and further in the combination with the image-receiving element A to which the Ni ion was relatively weakly fixed, almost all the compound was converted into the Ni chelate by the isolated Ni ions, thereby the absorption showed a great change.

On the other hand, the compound of this invention showed no change in the combinations with the image-receiving elements A and B.

Therefore, the compound of this invention is superior to the known compound M-1 with respect to always providing constant coating regardless of the coating conditions and drying conditions without substantially causing a reaction with the Ni ions isolated from the image-receiving element at the application of coating.

REFERENCE EXAMPLE 2

Coated layer A-(III)', B-(III)' and C-(III)' were prepared by the same manners of forming coated layers A-(I)', B-(I)' and C-(I)', respectively, except that Compound 13 was used in place of Compound 5 in Reference Example 1. Also, as contrast, coated layers A-(IV)', B-(IV)', and C-(IV)' were prepared by the same manners of forming coated layers A-(II)', B-(II)', and C-(II)', respectively, in Reference Example 1 except that Compound C-1 which was a known non-chelate compound was used.

The reflection spectrum of each of the coated layers thus-obtained was measured on the side of the dye-providing material layer.

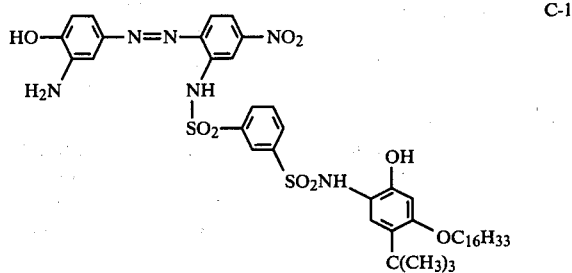

C-1

The results thus obtained are shown in Table 2.

TABLE 2

| Dye-Providing Material | Image-Receiving Layer A (Ni ion weakly fixed) | | Image-Receiving Layer B (Ni ion strongly fixed) | | Image-Receiving Layer C (No Ni ion) | |
|---|---|---|---|---|---|---|
| | Coated Layer | Absorption Maximum | Coated Layer | Absorption Maximum | Coated Layer | Absorption Maximum |
| Compound 13 (this invention) | A-(III)' | 600 nm | B-(III)' | 600 nm | C-(III)' | 600 nm |
| Compound C-1 (comparative) | A-(IV)' | 504 nm, 610 nm | B-(IV)' | 504 nm | C-(IV)' | 504 nm |

The known compound C-1 used as a comparative example showed, when coated on the image-receiving element C containing no Ni ion, the same spectrum as the case of coating on the image-receiving element B.

However, when the compound C-1 was coated on the image-receiving element A to which the Ni ion was relatively weakly fixed, the absorption originated from the Ni chelate appeared on the longer wavelength side. As the results of analyzing the absorption spectrum, it was confirmed that in the coated layer A-(IV)', about 50% of the dye-forming material C-1 thus coated caused an undesirable conversion into an Ni chelate compound by the Ni ions isolated from the image-receiving element at the preparation of the coated layer.

On the other hand, it is understood that Compound 13 does not cause a change of hue of the coated layer in the combination with any of the image-receiving elements and shows an excellent character of causing no reaction with Ni ions at the preparation of the coated layer.

EXAMPLE 1

On each of the coated layers prepared by the same manners as the case of forming coated layers A-(I)' and C-(I)' in Reference Example 1 except that a light shielding layer containing 0.75 g/m² of gelatin and 1.5 g/m² of carbon black was formed between the titanium dioxide layer and the dye-providing material layer in place of the gelatin layer were further coated the following layers to provide light-sensitive elements A-(I) and C-(I), respectively.

(1) A light-sensitive layer containing 1.9 g/m² of a green-sensitive internal latent image type silver halide emulsion, 0.022 g/m² of 2-methyl-3-(2-formylethyl)benzothiazolium bromide, 2.0 g/m² of gelatin, and 0.12 g/m² of 5-octadecylhydroquinone-2-sulfonic acid.

(2) An overcoat layer containing 2 g/m² of gelatin.

Also, as comparison examples, light-sensitive elements A-(II) and C-(II) were prepared by the same manner as the cases of preparing light-sensitive elements A-(II)' and C-(II)', respectively, except that the non-chelate compound M-1 was used as the dye-providing material.

Each of the light-sensitive elements A-(I), C-(I), A-(II), and C-(II) was uniformly exposed so that the reflection density at the image-receiving layer side after processing became about 0.1, the following cover sheet was superposed on the light-sensitive element, a processing composition having the following composition was spread between them, and after 30 minutes, the reflection spectrum at the image-receiving layer side was measured by means of a spectrophotometer.

Cover Sheet:
(1) A polyacrylic acid-containing neutralizing layer and
(2) a timing layer composed of a mixture of cellulose acetate and poly(styrene-co-maleic anhydride) formed on a poly(ethylene terephthalate) film support Processing Composition:

| | |
|---|---|
| KOH (28%) | 71 g |
| Na$_2$SO$_3$ | 2.0 g |
| 5-Methylbenzotriazole | 3.0 g |
| 4-Hydroxymethyl-4-methyl-1-phenyl-3-pyrazolidone | 5.0 g |
| KBr | 20 g |

The results obtained are shown in Table 3.

TABLE 3

| Light-Sensitive Material | Ni in Image-Receiving Layer | Dye-Providing Material | Absorption of Transferred Dye |
|---|---|---|---|
| A-(I) (the invention) | Added | Compound 5 | 530 nm, 564 nm |
| A-(II) (comparative) | Added | Known Compound M-1 | 530 nm, 564 nm |
| C-(I) (comparative) | None | Compound 13 | 526 nm, 558 nm |
| C-(II) (comparative) | None | Known Compound M-1 | 500 nm |

Also, when the cover sheet was peeled off from the processed light-sensitive element C-(II) and after immersing the element in a 0.1M nickel acetate bath for 10 minutes, the absorption spectra were measured, the absorption spectra were shown at 530 nm and 564 nm.

From the above results, it was confirmed that when the chelate dye released from the compound of this invention was associated with the image-receiving layer containing Ni ion, the exchange of the central coordinated metal occurred to form an Ni chelate, which formed a dye image in the image-receiving layer.

EXAMPLE 2

Each of unexposed light-sensitive elements A-(I), A-(II), C-(I) and C-(II) prepared by the same manners as in Example 1 was processed as in Example 1, the reflection density of the transferred dye after spreading to green light was measured at specific times, and the time ($t_{\frac{1}{2}}$) required for reaching $\frac{1}{2}$ of the density after 1 hour was measured.

TABLE 4

| Light-Sensitive Element | $t_{\frac{1}{2}}$ |
|---|---|
| A-(I) (the invention) containing Ni | 48 sec |
| A-(II) (comparative) containing Ni | 76 sec |
| C-(I) (comparative) containing no Ni | 46 sec |
| C-(II) (comparative) containing no Ni | 47 sec |

When the light-sensitive element A-(II) using the known compound was associated with the mordant layer containing Ni ion, the known compound was converted into an Ni chelate compound by the Ni ion isolated. (Reference Example 1), thereby the transferring speed of the dye was greatly delayed as compared to the light-sensitive element C-(II) containing no Ni, i.e., the known compound M-1 was not reacted with Ni. On the other hand, in the light-sensitive element A-(I) containing the compound of this invention, such a delay did not occur and in the association with the image-receiving element containing Ni, a sufficiently high transferring speed was shown.

EXAMPLE 3

Each of the light-sensitive elements A-(I) and C-(I) prepared by the same manners as in Example 1 was exposed and processed as in Example 1. After one day, the cover sheet was peeled off and then the element was exposed to a xenon fade-o-meter (100,000 lux) for 7 days. The densities thereof before and after the exposure and the ratio are shown in Table 5.

TABLE 5

| Light-Sensitive Material | Density before Exposure (D°) | Density after Exposure (D') | D'/D° |
|---|---|---|---|
| A-(I) (invention) | 1.5 | 1.43 | 95% |
| C-(I) (comparative) | 1.5 | 0.45 | 30% |

When the compound of this invention was associated with the image-receiving layer containing Ni ion, a dye image having excellent light fastness was obtained.

EXAMPLE 4

On each of the coated layers was coated the same layers A-(III)', A-(IV)', B-(III)', and B-(VI)' in Reference Example 2 except that a light shielding layer containing 1.5 g/m² of carbon black and 0.75 g/m² of gelatin was formed between the titanium dioxide layer and the dye-providing material layer in place of the gelatin layer were formed the following layers to provide light-sensitive elements A-(III), A-(IV), B-(III) AND B-(IV), respectively.

(1) A light-sensitive layer containing 1.9 g/m² of an internal latent image type silver halide emulsion, 0.022 g/m² of 2-methyl-3-(2-formylethyl)benzothiazolium bromide, 2.0 g/m² of gelatin and 0.12 g/m² of 5-octadecylhydroquinone-2-sulfonic acid, and (2) An overcoat layer containing 2 g/m² of gelatin.

Also, light-sensitive elements C-(III), D-(III), C-(IV) and D-(IV) were prepared by the same means used to prepare the foregoing light-sensitive elements A-(III), B-(III), A-(IV) and B-(IV), respectively, except that Ni ion was not incorporated in each image-receiving layer.

Each of the foregoing light-sensitive elements was uniformly exposed so that the reflection density of the image-receiving layer side after processing to red light became about 1.0, processed as in Example 1, and then the reflection spectrum at the image-receiving layer side was measured. The results obtained are shown in Table 6.

TABLE 6

| Light-Sensitive Element | Ni Ion in Image-Receiving Layer | Dye-Providing Material | Absorption Maximum of Mordanted Dye |
|---|---|---|---|
| A-(III) (invention) | Added (weakly fixed) | Compound 5 | 615 nm |
| A-(IV) | Added (weakly fixed) | Known Compound C-1 | 615 nm |
| C-(III) | None | Compound 5 | 600 nm |
| C-(IV) | None | Known Compound C-1 | 510 nm |
| B-(III) | Added (strongly fixed) | Compound 5 | 598 nm |
| B-(IV) | Added (strongly fixed) | Known Compound C-1 | 505 nm |
| D-(III) | None | Compound 5 | 598 nm |
| D-(IV) | None | Known Compound C-1 | 505 nm |

Also, after peeling off the cover sheet, each of the light-sensitive elements C-(IV) and D-(IV) processed was immersed in a solution of 0.1N Ni(CH$_3$COO)$_2$ for 30 minutes and the absorption spectrum was measured. The absorption maximum was 615 nm in C-(IV) and 610 nm in D-(IV).

From the above results, it is understood that when Ni ion is strongly fixed in the image-receiving element, the transferred dye is reluctant to form an Ni chelate compound but when a dye-providing material is associated with the image-receiving element to which Ni ion is weakly fixed, each of the compound of this invention and the known compound C-1 is completely converted into the corresponding Ni chelate compound.

However, in this case the known compound is partially converted into an Ni compound by a slight amount of the Ni ion isolated from the image-receiving element and thus denatured as shown in Reference Example 2. For inhibiting the occurrence of the undesirable reaction of forming an Ni compound, Ni ion may be strongly fixed in the image-receiving element (see, Reference Example 2) but in this case, the formation of the Ni chelate compound of the transferred dye is insufficient.

On the other hand, the light-sensitive element A-(III) of this invention has desirable characteristics in that the dye-providing material does not substantially react with the Ni ion from the image-receiving element during the preparation and preservation of the light-sensitive element and also the transferred dye is mordanted in the image-receiving element after being completely converted into the Ni chelate.

EXAMPLE 5

By forming between the green-sensitive photosensitive layer and the carbon black layer of each of the light-sensitive elements A-(I) and A-(II) the following layers, in succession, from the carbon black layer side, corresponding light-sensitive elements A''-(I) and A''-(II) were prepared.

(1) A layer containing 0.50 g/m$^2$ of dye-providing material C-2 and 1.1 g/m$^2$ of gelatin.

(2) A red-sensitive photosensitive layer containing 2.0 g/m$^2$ of a red-sensitive internal latent image type silver halide emulsion, 0.022 g/m$^2$ of 2-methyl-3-(2-formylethyl)benzothiazolium bromide, 2.0 g/m$^2$ of gelatin, and 0.12 g/m$^2$ of 5-octadecylhydroquinone-2-sulfonic acid.

(3) A layer containing 2.6 g/m$^2$ of gelatin and 0.8 g/m$^2$ of 2,5-di-t-pentadecylhydroquinone.

C-2 (for comparison)

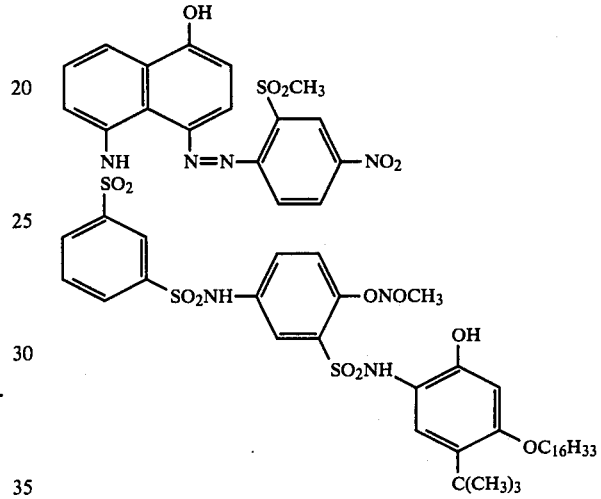

The light-sensitive elements A''-(I) and A''-(II) and also the same light-sensitive elements subjected to forcible perservative test by being allowed to stand for 3 days at 45° C. and 70% relative humidity were subjected to a separation exposure, processed by the same manner as in Example 1, and after 1 hour, a sensitometric measurement was performed on each sample. The results are shown in Table 7.

TABLE 7

| Light-Sensitive Element | Sensitivity of Red-Sensitive Layer by the Forcible Test (to the sensitivity thereof without forcible test) |
|---|---|
| A''-(I) (invention) | 1.0 |
| A''-(II) (comparative) | 0.7 |

In the light-sensitive element A''-(II) containing the known dye-providing material which is liable to react with Ni ion, the formation of the Ni chelate of said dye-forming material proceeds by the Ni ion isolated from the image-receiving element when preserving the light-sensitive element under adverse conditions to shift the absorption spectrum to a longer wavelength side as shown in Reference Example 1. Thus, the filter effect influenced on the red-sensitive layer disposed at the lower layer of the dye-providing material which was converted into the Ni chelate compound from the incident light side changes. On the other hand, in the light-sensitive element A''-(I) containing the compound of this invention, it is understood that the light-sensitive element has an excellent feature of not changing the sensitivity thereof even when the light-sensitive element is preserved under adverse conditions.

EXAMPLE 6

Light-sensitive elements A-(V) and C-(V) were prepared in the same manner used to prepare the light-sensitive elements A-(I) and C-(I) respectively in Example 1 except that Compound 1, a yellow dye-providing material, was used as the dye-providing material.

Also, for the sake of comparison, light-sensitive elements A-(VI) and C-(VI) were prepared in the same manner used to prepare the light-sensitive elements A-(II) and C-(II) respectively in Example 1 except that non-chelate compound Y-1 shown below was used in place of Compound 1.

After processing each of the light-sensitive elements A-(V), C-(V), A-(VI) and C-(VI), the light-sensitive element was uniformly exposed so that the reflection density at the mordant layer side became almost 1.0 and then after superposing a cover sheet on the light-sensitive element, the processing composition as in Example 1 was spread between them to process the light-sensitive element.

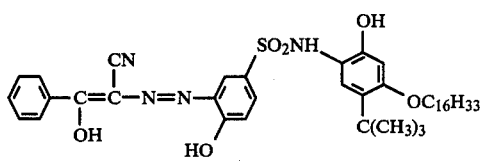

Y-1

The characteristics of the light-sensitive elements thus-obtained are shown in Table 8.

The cover sheet of the light-sensitive element C-(VI) thus-processed was peeled off and immersed in a 0.1M nickel acetate bath for 10 minutes. The absorption spectrum thereof was then measured and the absorption maximum was observed at 474 nm.

TABLE 8

| Light-Sensitive Element | Ni (II) in Mordant Layer | Dye-Providing Material | Absorption of Transferred Dye ($\lambda$max) | Transferring Speed ($t_{\frac{1}{2}}$) | Light Stability (remaining percentage) | Note |
| --- | --- | --- | --- | --- | --- | --- |
| A-(V) | Added | Compound 1 | 474 nm | 39 sec | 99% | Invention |
| A-(VI) | Added | Known Compound Y-1 | 474 nm | 66 sec | 99% | Comparative |
| C-(V) | None | Compound 1 | 425 nm | 38 sec | 23% | Comparative |
| C-(VI) | None | Known Compound Y-1 | 410 nm | 35 sec | 10% | Comparative |

From the above results, it is understood that the compound of this invention is desirable with respect to providing color images having excellent light fastness as well as providing a dye with a high transferring speed.

EXAMPLE 7

Light-sensitive element D was prepared by further coating the following layers on the image-receiving element prepared by the same manner as preparing the image-receiving element A in Reference Example 1 except that a light-shielding layer containing 0.75 g/m² of gelatin and 1.5 g/m² of carbon black was coated on the TiO₂ layer.

(1) A light-sensitive layer containing a silver iodobromide emulsion (1.0 g Ag per m²) and 2.0 g/m² of gelatin.

(2) A dye-providing material layer prepared by coating a coating composition prepared by dissolving 0.5 g/m² of the compound of this invention and 1 g/m² of ballasted reducing agent precursor, 4-(2-acetoxy-2-pivaloyl-acetamido)-N-[4-(2,4-di-t-pentylphenoxy)-butyl]-1-hydroxy-2-naphthamide in 0.8 g of tricresyl phosphate and dispersing the solution in an aqueous gelatin solution.

(3) A gelatin overcoat layer (0.3 g/m²).

The light-sensitive element D was exposed, the cover sheet as shown in Example 1 was disposed on the element, and the processing composition having the same formulation as in Example 1 was spread between them. Thus, a positive cyan image was obtained in the image-receiving layer. When the reflectance spectrum at the Dmax portion was measured, the absorption maximum was 638 nm.

While the invention has been described in detail and with reference to specific embodiments thereof, it will be apparent to one skilled in the art that various changes and modifications can be made therein without departing from the spirit and scope thereof.

What is claimed is:

1. A color diffusion transfer photographic element comprising at least a support, an image-receiving layer associated with a metal ion and a layer containing a dye-providing material associated with a light-sensitive silver halide emulsion, wherein said dye-providing material is a metal chelate compound represented by the following general formula (I) or (II):

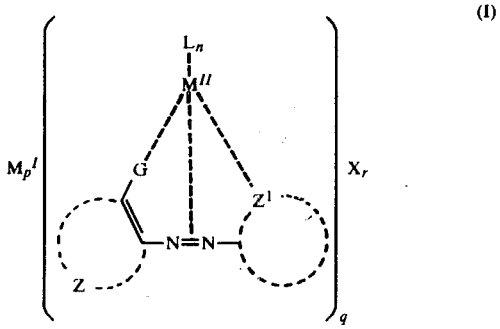

(I)

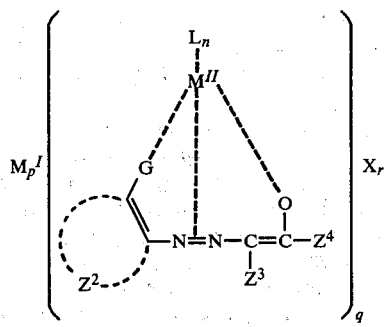 (II)

wherein $M^I$ represents a monovalent, divalent, or trivalent cation; X represents a monovalent, divalent, or trivalent anion; Z and $Z^2$ each represents an aromatic carbon ring nucleus or heterocyclic ring nucleus having 5 to 7 carbon atoms; G represents a chelating group; $Z^1$ represents an aromatic carbon ring nucleus or heterocyclic nucleus composed of 5 to 7 carbon atoms; said nucleus having (a) a nitrogen atom, or (b) a carbon atom bonded to a chelating group at the position adjacent to the position bonded to the azo group; $Z^3$ represents an electron attractive group; $Z^4$ represents an alkyl group, an aryl group, or a substituted amino group; L represents a ligand including a dye ligand; $M^{II}$ represents a metal ion weakly coordinated to the dye ligand moiety as compared with the metal ion associated with the image-receiving layer; p, r and n each is an integer of 0 to 5 and q is 1, 2 or 3, with the proviso that the charges of the total chelate dyes become zero, and wherein the chelate compound further contains (1) a carrier component losing the diffusible property or (2) a ballasted carrier capable of releasing a diffusible dye when the silver halide emulsion is developed under an alkaline condition, whereby the $M^{II}$ ion as chelate metal is substituted by the metal ion associated with the image-receiving layer during processing of the element.

2. The color diffusion transfer photographic element as claimed in claim 1, wherein Z in general formula (I) represents a benzene ring, a pyrazole ring, a pyrimidine ring, or a pyridine ring, and wherein $Z^1$ represents a group represented by one of the following formulae (a), (b), (c), (d), (e), (f), (g) and (h):

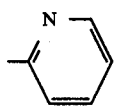 (a)

 (b)

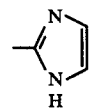 (c)

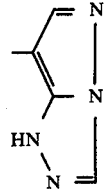 (d)

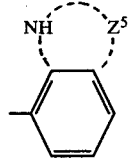 (e)

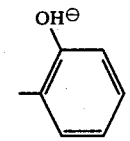 (f)

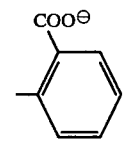 (g)

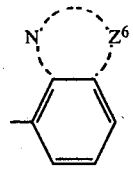 (h)

wherein $Z^5$ represents a hydrogen atom, an arylsulfone group, a saturated aliphatic ring or a non-metallic atom necessary to complete a saturated aliphatic ring fused to a benzene ring nucleus and wherein $Z^6$ represents a non-metallic atom necessary to complete a 5- to 6-membered aromatic ring fused to a benzene ring.

3. The color diffusion transfer photographic element as claimed in claim 1, wherein $Z^2$ in general formula (II) represents a benzene ring; $Z^3$ represents a substituted or unsubstituted sulfamoyl group, a substituted or unsubstituted carbamoyl group, an alkylsulfonyl group, an arylsulfonyl group, or a cyano group; and $Z^4$ represents an alkyl group having 1 to 8 carbon atoms, an aryl group having 6 to 10 carbon atoms, or an amino group substituted by an aryl group having 1 to 8 carbon atoms.

4. The color diffusion transfer photographic element as claimed in claim 1, wherein G in general formula (I) is selected from the group consisting of a hydroxyl group, an amino group, a carboxy group, and a sulfamoyl group.

5. The color diffusion transfer photographic element as claimed in claim 1, wherein G in general formula (II) is selected from the group consisting of a hydroxyl group, an amino group, a carboxy group and a sulfamoyl group.

6. The color diffusion transfer photographic element as claimed in claim 2, wherein G in general formula (I) or (II) is selected from the group consisting of a hydroxy group, an amino group, a carboxy group, and a sulfamoyl group.

7. The color diffusion transfer photographic element as claimed in claim 1, wherein $M^{II}$ is Zn (II), Pb (II) or Mn (II).

8. The color diffusion transfer photographic element as claimed in claim 1, wherein $M^{II}$ in general formula (I) or (II) is Zn (II), Pb (II), Sn (II), Mn (II), Al (III), Sn (IV), Zr (IV), Bi (III) or In (III).

9. The color diffusion transfer photographic element as claimed in claim 1, wherein the carrier component is bonded to Z or $Z^1$ in general formula (I), or to $Z^2$ or $Z^4$ in general formula (II).

10. The color diffusion transfer photographic element as claimed in claim 1, wherein the carrier component is bonded to Z or $Z^1$ in general formula (I) and is represented by the following formula:

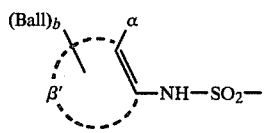

wherein $\beta'$ represents a non-metallic atomic group necessary for forming a benzene ring; $\alpha$ represents a group shown by —$OG^1$ or —$NHG^2$ (wherein $G^1$ represents a hydrogen atom or a group forming a hydroxyl group by decomposition and $G^2$ represents a hydrogen atom, an alkyl group having 1 to 22 carbon atoms, or a hydrolyzable group); b is 0, 1, or 2; said b is, however, 1 or 2 when $\alpha$ is a group shown by —$OG^1$ or when $\alpha$ is shown by —$NHG^2$ and $G^2$ is a hydrogen atom, an alkyl group having 1 to 8 carbon atoms, or a hydrolyzable group; and Ball represents a ballast group.

11. The color diffusion transfer photographic element as claimed in claim 1, wherein the carrier component is bonded to Z or $Z^1$ in general formula (I) and is represented by the following formula:

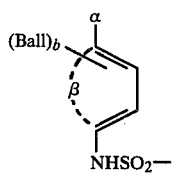

wherein $\beta$ represents a non-metallic atomic group necessary for forming a benzene ring; $\alpha$ represents a group shown by —$OG^1$ or —$NHG^2$ (wherein $G^1$ represents a hydrogen atom or a group forming a hydroxyl group by decomposition and $G^2$ represents a hydrogen atom, an alkyl group having 1 to 22 carbon atoms, or a hydrolyzable group); b is 0, 1, or 2; said b is, however, 1 or 2 when $\alpha$ is a group shown by —$OG^1$ or when $\alpha$ is shown by —$NHG^2$ and $G^2$ is a hydrogen atom, an alkyl group having 1 to 8 carbon atoms, or a hydrolyzable group; and Ball represents a ballast group.

12. The color diffusion transfer photographic element as claimed in claim 1, wherein the carrier component is bonded to Z or $Z^1$ and is represented by the following formula:

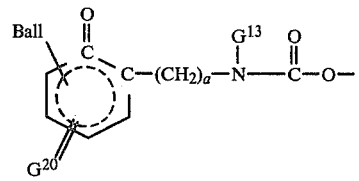

wherein Ball represents a ballast group; $G^{20}$ represents an imido group; a is 0 or 1; and $G^{13}$ represents an alkyl group having 1 to 40 carbon atoms or an aryl group having 6 to 40 carbon atoms.

13. The color diffusion transfer photographic element as claimed in claim 1, wherein said image-receiving layer contains a mordant and said photographic element contains a salt or a chelate compound of Ni, Pd, Cu, or Pt in the mordant containing image-receiving layer or a layer adjacent to said mordant containing image-receiving layer.

14. The color diffusion transfer photographic element as claimed in claim 2, wherein the groups represented by the formulae (a), (b), (c), (d), (e), (f), (g) and (h) contain substituents within the ring.

15. The color diffusion transfer photographic element as claimed in claim 2, wherein the group represented by the formulae (a), (b), (c), (d), (e), (f), (g) and (h) has an aromatic carbon ring nucleus attached thereto.

16. The color diffusion transfer photographic element as claimed in claim 1, wherein $Z^2$ in general formula (II) represents a benzene ring; $Z^3$ represents a substituted or unsubstituted sulfamoyl group, a substituted or unsubstituted carbamoyl group, an alkylsulfonyl group, an arylsulfonyl group or a cyano group; and $Z^4$ represents an alkyl group having 1 to 8 carbon atoms, an aryl group having 6 to 10 carbon atoms, or an amino group substituted by an aryl group having 1 to 8 carbon atoms; and wherein $M^{II}$ in general formula (I) or (II) is Zn (II), Pb (II), Sn (II), Mn (II), Al (III), Sn (IV), Zr (IV), Bi (III), or In (III).

17. The color diffusion transfer photographic element as claimed in claim 1, wherein the element is a unitary color photographic element and the support has coated thereon in the following order:
the image-receiving layer associated with a metal ion,
a light-reflecting layer having alkali permeability,
an opaque layer having alkali permeability, and a silver halide emulsion layer associated with the metal chelate compound represented by the general formula (I) or (II).

18. The color diffusion transfer photographic element as claimed in claim 17, wherein the element is further comprised of:
a red-sensitive silver halide emulsion layer associated with a ballasted cyan chelate dye releaser,
a green-sensitive silver halide emulsion layer associated with a ballasted magenta chelate dye releaser, and
a blue-sensitive silver halide emulsion layer associated with a ballasted yellow chelate dye releaser;
a transparent sheet having formed thereon, in succession on a transparent support a neutralizing layer and a timing layer, said transparent sheet being superposed on the blue-sensitive silver halide emulsion layer; and
a rupturable container retaining an alkaline processing composition and an opacifying agent; said container being disposed in such a manner that the container can release the content between the transparent sheet and the blue-sensitive silver halide emulsion layer by a compressive force applied to the vessel when processing the photographic element.

* * * * *